United States Patent
Mukunoki et al.

(10) Patent No.: US 12,355,245 B2
(45) Date of Patent: Jul. 8, 2025

(54) REACTIVE POWER COMPENSATION DEVICE

(71) Applicants: Mitsubishi Electric Corporation, Tokyo (JP); TOSHIBA MITSUBISHI-ELECTRIC INDUSTRIAL SYSTEMS CORPORATION, Tokyo (JP)

(72) Inventors: Kaho Mukunoki, Tokyo (JP); Toshiyuki Fujii, Tokyo (JP); Akihiro Matsuda, Tokyo (JP); Ryota Okuyama, Tokyo (JP)

(73) Assignees: MITSUBISHI ELECTRIC CORPORATION, Tokyo (JP); TMEIC CORPORATION, Tokyo (JP)

( * ) Notice: Subject to any disclaimer, the term of this patent is extended or adjusted under 35 U.S.C. 154(b) by 174 days.

(21) Appl. No.: 18/031,010

(22) PCT Filed: Oct. 21, 2020

(86) PCT No.: PCT/JP2020/039502
§ 371 (c)(1),
(2) Date: Apr. 10, 2023

(87) PCT Pub. No.: WO2022/085101
PCT Pub. Date: Apr. 28, 2022

(65) Prior Publication Data
US 2023/0411963 A1    Dec. 21, 2023

(51) Int. Cl.
*H02J 3/18* (2006.01)
*G05F 1/70* (2006.01)
*H02J 3/16* (2006.01)

(52) U.S. Cl.
CPC ............. *H02J 3/1857* (2013.01); *G05F 1/70* (2013.01); *H02J 3/16* (2013.01)

(58) Field of Classification Search
CPC .... H02J 3/18; H02J 3/16; H02J 3/1857; H02J 3/1864; H02J 3/26; H02M 7/02;
(Continued)

(56) References Cited

U.S. PATENT DOCUMENTS

| | | | | |
|---|---|---|---|---|
| 8,552,696 B2 * | 10/2013 | Morishima | ............... | G05F 1/70 |
| | | | | 323/207 |
| 2016/0109493 A1 * | 4/2016 | Cheng | ................... | H02J 3/1857 |
| | | | | 324/76.12 |

(Continued)

FOREIGN PATENT DOCUMENTS

| JP | 05-304725 A | 11/1993 |
|---|---|---|
| JP | 2002-238163 A | 8/2002 |

(Continued)

OTHER PUBLICATIONS

Japanese Office Action issued Jun. 7, 2024, in corresponding Japanese Patent Application No. JP2022-556283, 5pp.

(Continued)

*Primary Examiner* — Fred E Finch, III
(74) *Attorney, Agent, or Firm* — XSENSUS LLP

(57) ABSTRACT

A reactive power compensation device includes a power converter and a converter control unit, and compensates reactive power of an AC power grid by output reactive power of the power converter. The converter control unit includes an AC voltage detection unit and an output limit unit. The AC voltage detection unit detects voltage information of the AC power grid to which the power converter is connected. The output limit unit determines whether or not the output reactive power of the power converter needs to be limited, on the basis of the voltage information detected by the AC voltage detection unit, and in a case where the output reactive power needs to be limited, limits the output reactive power of the power converter.

18 Claims, 17 Drawing Sheets

(58) Field of Classification Search
CPC ............. H02M 7/1555; H02M 7/1551; H02M 7/1552; H02M 5/293; G05F 1/70
See application file for complete search history.

(56) References Cited

U.S. PATENT DOCUMENTS

| | | | |
|---|---|---|---|
| 2018/0006580 A1* | 1/2018 | Lung | ........................ H02M 5/04 |
| 2020/0112172 A1* | 4/2020 | Yamanaka | ............. H02H 3/247 |
| 2020/0161960 A1* | 5/2020 | Mukunoki | ................. H02J 3/26 |
| 2020/0287455 A1* | 9/2020 | Okuyama | ......... H02M 7/53871 |

FOREIGN PATENT DOCUMENTS

| | | |
|---|---|---|
| JP | 2011-036033 A | 2/2011 |
| JP | WO2010/055557 A1 | 4/2012 |
| JP | 5134691 B2 | 1/2013 |
| JP | 2019-122144 A | 7/2019 |
| JP | 2019-149850 A | 9/2019 |

OTHER PUBLICATIONS

International Search Report and Written Opinion mailed on Jan. 12, 2021, received for PCT Application PCT/JP2020/039502, filed on Oct. 21, 2020, 9 pages including English Translation.
Extended European Search Repot mailed Nov. 8, 2023, in European Patent Application No. 20958654.4, 11 pages.
Japanese Office Action issued Jul. 2, 2024, in corresponding Japanese Patent Application No. JP2022-556283, 5pp.

\* cited by examiner

REACTIVE POWER COMPENSATION DEVICE

CROSS-REFERENCE TO RELATED APPLICATION

The present application is based on PCT filing PCT/JP2020/039502, filed Oct. 21, 2020, the entire contents of which are incorporated herein by reference.

TECHNICAL FIELD

The present disclosure relates to a reactive power compensation device.

BACKGROUND ART

In recent years, new energy sources such as photovoltaic generation and wind power generation nave been increasingly introduced, and stabilizing a power grid and ensuring reliability thereof are important matters. For stabilizing a power grid, a reactive power compensation device is introduced. In particular, a static synchronous compensator not only aims at stabilizing a grid during steady operation but also is required to compensate reactive power during failure of the grid and at the time of eliminating the failure of the grid, and thus is required to stabilize the power grid also in a transient case (see, for example, Patent Document 1).

CITATION LIST

Patent Document

Patent Document 1: Japanese Patent No. 5134691

Problems to be Solved by the Invention

Such a reactive power compensation device is, for its usage purpose, often interconnected to a power grid of which the short-circuit capacity is small and grid voltage is likely to vary. Also in a case of being interconnected to such a power grid, the reactive power compensation device is required to, upon grid failure such as ground fault, continue operation and compensate reactive power, thereby stabilizing the power grid.

In the case where the reactive power compensation device is interconnected to the power grid having a small short-circuit capacity, an unbalance failure such as a one-phase ground fault in which the voltage amplitude for only one phase is reduced can occur. If reactive power is outputted when such an unbalance failure has occurred, voltage for a phase in which the voltage is not reduced (hereinafter, referred to as sound phase) further increases. That is, while positive-phase-sequence voltage of the grid voltage is reduced, voltage for a sound phase can become greater than voltage in the operation range of the reactive power compensation device. In such a case, a control margin is not sufficiently ensured for voltage/current control of the reactive power compensation device, so that the control performance is deteriorated, and the reactive power compensation device might be stopped for protection due to overvoltage or overcurrent.

In particular, in such a condition that a control margin is not sufficiently ensured while a grid failure occurs, if the grid failure is eliminated, the reactive power compensation device cannot perform its original operation because there is no control margin, to perform control for great voltage variation when the grid failure is eliminated.

The present disclosure has beer, made to solve the above problem, and an object of the present disclosure is to ensure a control margin of a reactive power compensation device and prevent the reactive power compensation device from being stopped for protection due to overvoltage or overcurrent.

Solution to the Problems

A reactive power compensation device according to the present disclosure includes: a power converter connected to an AC power grid with a plurality of phases, and having a self-turn-off switching element; and a converter control unit which controls the switching element of the power converter. Reactive power of the AC power grid is compensated by output reactive power of the power converter. The converter control unit includes an AC voltage detection unit and an output limit unit. The AC voltage detection unit detects voltage information of the AC power grid to which the power converter is connected. The output limit unit determines whether or not the output reactive power of the power converter needs to be limited, on the basis of the voltage information detected by the AC voltage detection unit, and in a case where the output reactive power needs to be limited, limits the output reactive power of the power converter.

Effect of the Intention

The reactive power compensation device according to the present disclosure makes it possible to ensure a control margin of the reactive power compensation device and prevent the reactive power compensation device from being stopped for protection due to over voltage or overcurrent.

DESCRIPTION OF EMBODIMENTS

Embodiment 1

Hereinafter, a reactive power compensation device 1 according to embodiment 1 of the present disclosure will be described with reference to the drawings.

Figure 1:
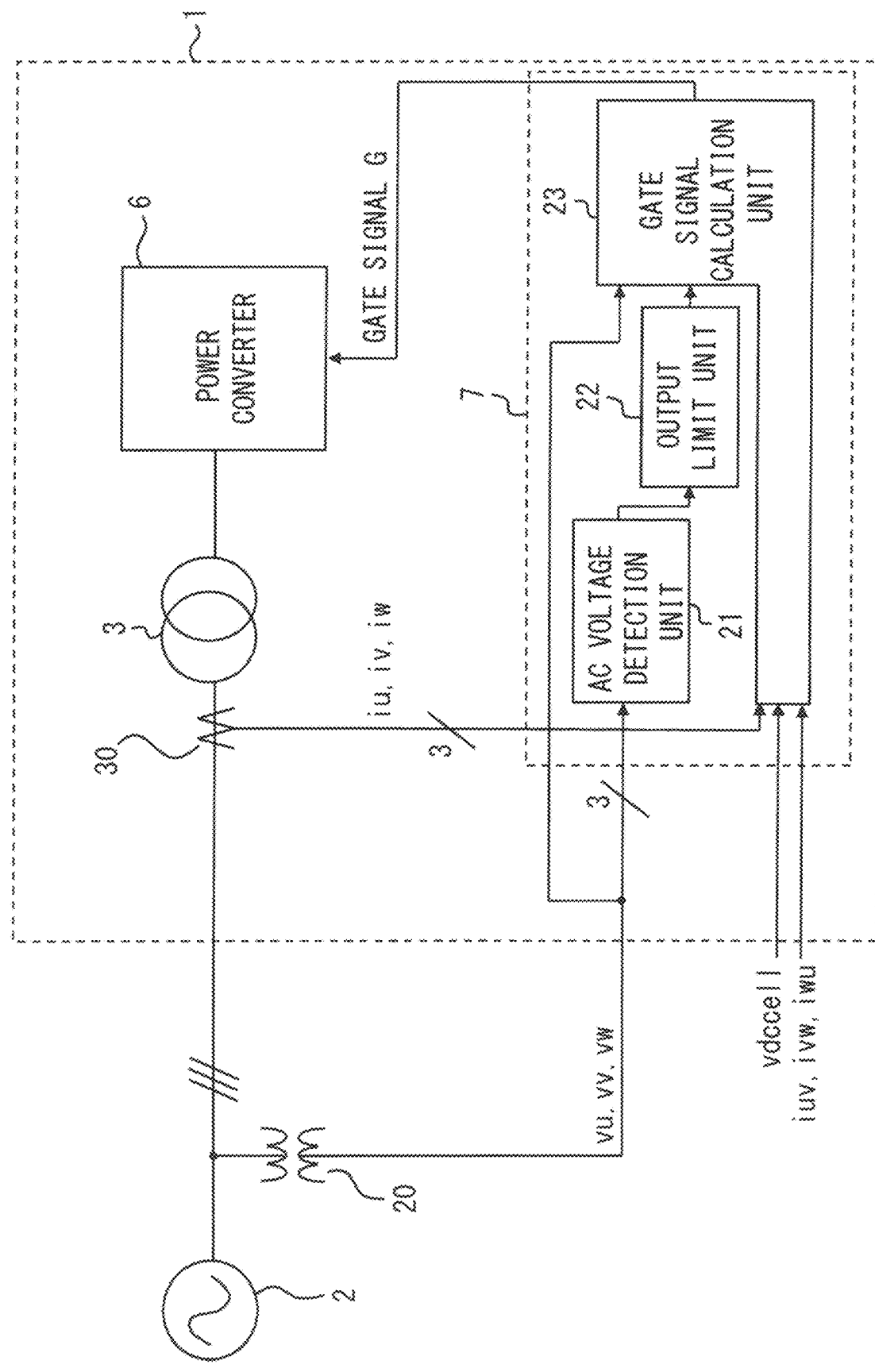
FIG. 1 is a schematic configuration diagram showing a reactive power compensation device according to embodiment 1.

FIG. 1 is a schematic configuration diagram showing the reactive power compensation device 1 according to embodiment 1.

As shown in FIG. 1, the reactive power compensation device 1 includes a power converter 6 which is a main circuit, and a converter control unit 7 for controlling the power converter 6. The power converter 6 is connected to an AC power grid 2 with a plurality of phases (in the present embodiment, three phases) via an interconnection transformer 3, and includes self-turn-off switching elements as described later. Although the power converter 6 is connected to the AC power grid 2 via the interconnection transformer 3 in FIG. 1, the power converter 6 may be connected to the AC power grid 2 via an interconnection reactor.

In FIG. 1, the configuration of the converter control unit 7 is shown focusing on passing/reception of signals between the AC power grid 2 and the power converter 6, and therefore is partially omitted.

The converter control unit 7 includes an AC voltage detection unit 21 which detects voltage information on the basis of grid voltage detected by a voltage detector 20 for detecting grid voltage at the interconnection point between the power converter 6 and the AC power grid 2, an output limit unit 27 which calculates a limit value for reactive current or reactive power on the basis of the voltage information detected by the AC voltage detection unit 21, and a gate signal calculation unit 23. The gate signal calculation unit 23 performs pulse width modulation (PWM) control on the basis of AC currents iu, iv, iw detected by a current detector 30, grid voltage vu, vv, vw detected by the voltage detector 20, the limit value calculated by the output limit snit 22, and the like, to calculate a gate signal G for controlling each switching element of the power converter 6.

The details of the configuration and the function of the converter control unit 7 will be described later, with reference to FIG. 5.

Figure 2:
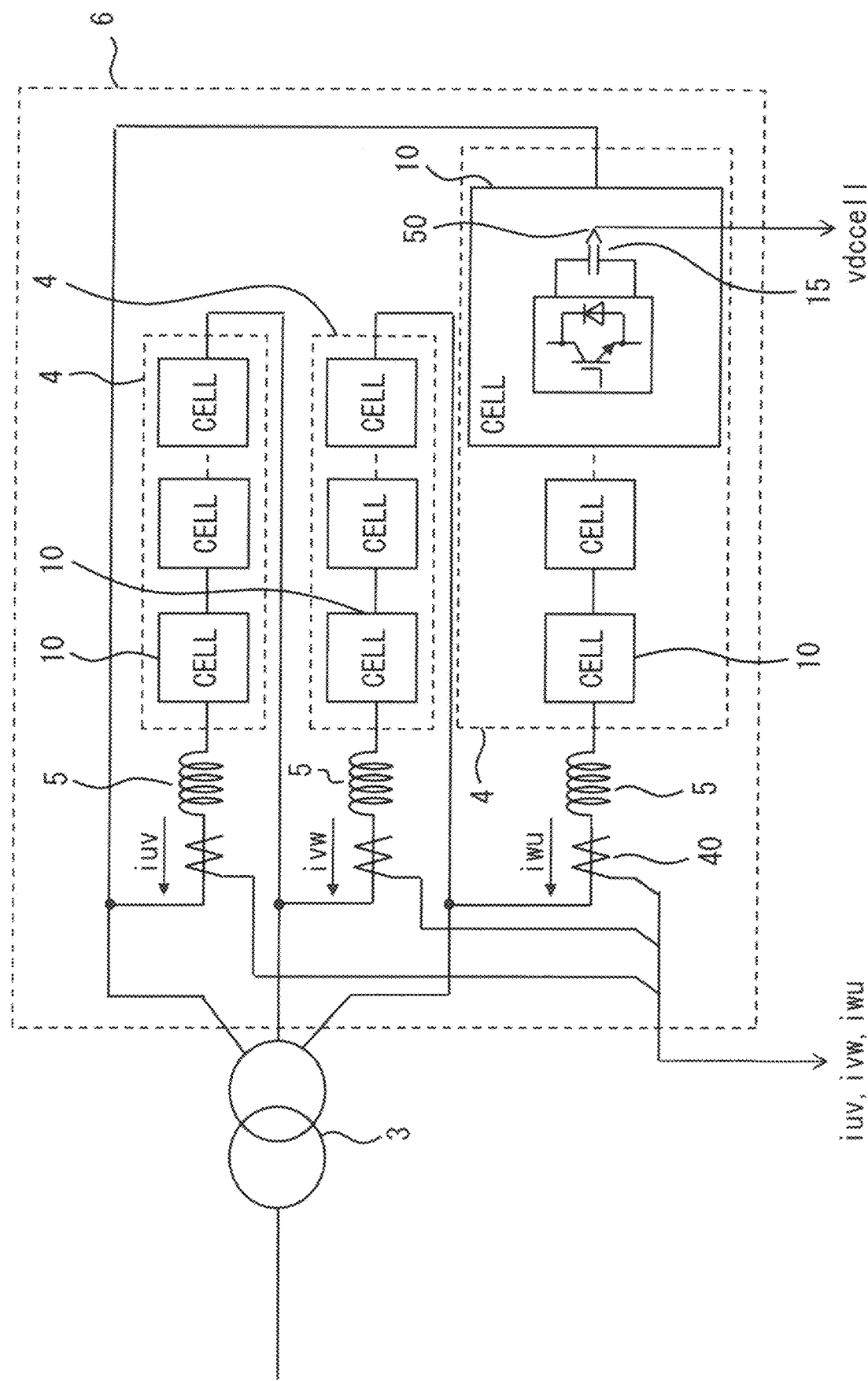
FIG. 2 is a circuit diagram showing a configuration example of a power converter according to embodiment 1.

FIG. 2 is a circuit diagram showing a configuration example of the power converter 6 according to embodiment 1.

Because the power converter 6 is interconnected to the AC power grid 2, the power converter 6 needs to be a device having a large capacity and high withstand voltage, and therefore needs to have a plurality of converters connected in series or parallel in a multiplexed manner. As a direct-connection, power conversion device, a multilevel converter in which outputs of a plurality of converters are connected in cascade is proposed, and one example thereof is a modular multilevel converter (MMC). The power converter 6 according to embodiment 1 is a type of MMC.

As shown in FIG. 2, the power converter 6 includes arms 4 for respective phases (U phase, V phase, W phase), and in the arm 4 for each phase, a plurality of unit cells 10 are connected in series, and an arm reactor 5 is connected in series thereto. The arms 4 for the respective phases are connected in delta connection, and the connection end of the arm 4 for each phase is connected to the AC power grid 2 via the interconnection transformer 3.

The power converter 6 includes arm current detectors 40 for detecting currents iuv, ivw, iwu of the arms 4 for the respective phases. Further, the power converter 6 includes DC capacitor voltage detectors 50 for detecting voltages vdccell of DC capacitors 15 in the unit cells 10 described later.

Next, the internal configuration of the unit cell 10 will be described with reference to FIG. 3 and FIG. 4.

Figure 3:
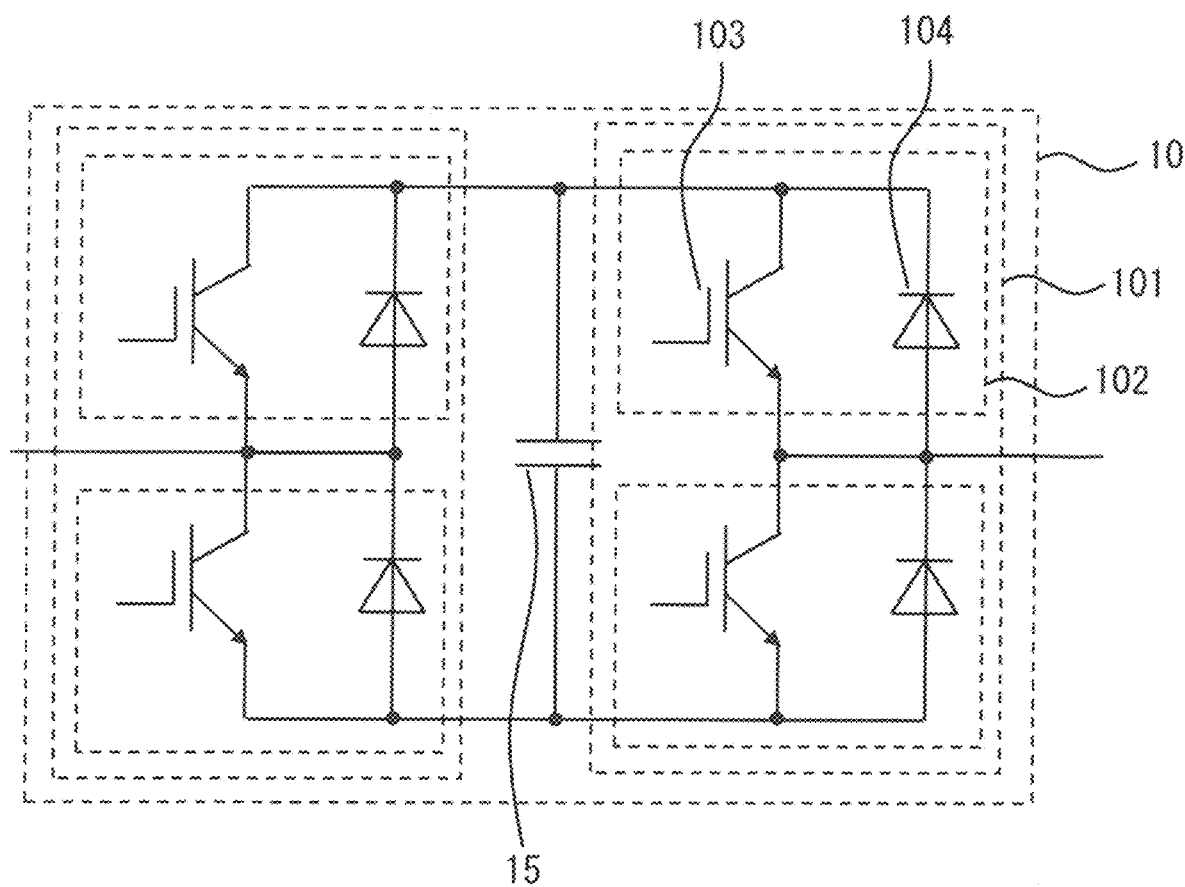
FIG. 3 is a circuit diagram showing the internal configuration of a unit cell according to embodiment 1.

FIG. 3 is a circuit diagram showing the internal configuration of the unit cell 10 in a full-bridge form. As shown in FIG. 3, the unit cell 10 includes two series units 101 connected in parallel and each composed of self-turn-off switching elements 103 such as insulated-gate bipolar transistors (IGBT), and the DC capacitor 15 connected in parallel to the series units 101. The series unit 101 includes a plurality of (here, two) semiconductor switches 102 connected in series and each composed of the switching element 103 to which a diode 104 is connected in antiparallel. As shown in FIG. 3, in the unit cell 10, terminals of the semiconductor switches 102 at an intermediate connection point of each series unit 101 are used as output ends, and the switching elements 103 are ON/OFF controlled to output the same-polarity voltage of the DC capacitor 15, the opposite-polarity voltage thereof, or zero voltage from the output ends.

Another configuration example of the unlit cell 10 will be described with reference to FIG. 4. FIG. 4 is a circuit diagram showing the internal configuration of the unit cell 10 in a half-bridge form. In FIG. 4, the unit cell 10 includes the series unit 101 composed of the switching elements 103, and the DC capacitor 15 connected in parallel to the series unit 101. The series unit 101 includes a plurality of (here, two) semiconductor switches 102 connected in series and each composed of the switching element 103 to which the diode 104 is connected in antiparallel. As shown in FIG. 4, in the unit cell 10, both terminals of one of the semiconductor switches 102 are used as output ends, and the switching elements 103 are ON/OFF controlled to output the same-polarity voltage of the DC capacitor 15 or zero voltage from the output ends.

Figure 4:
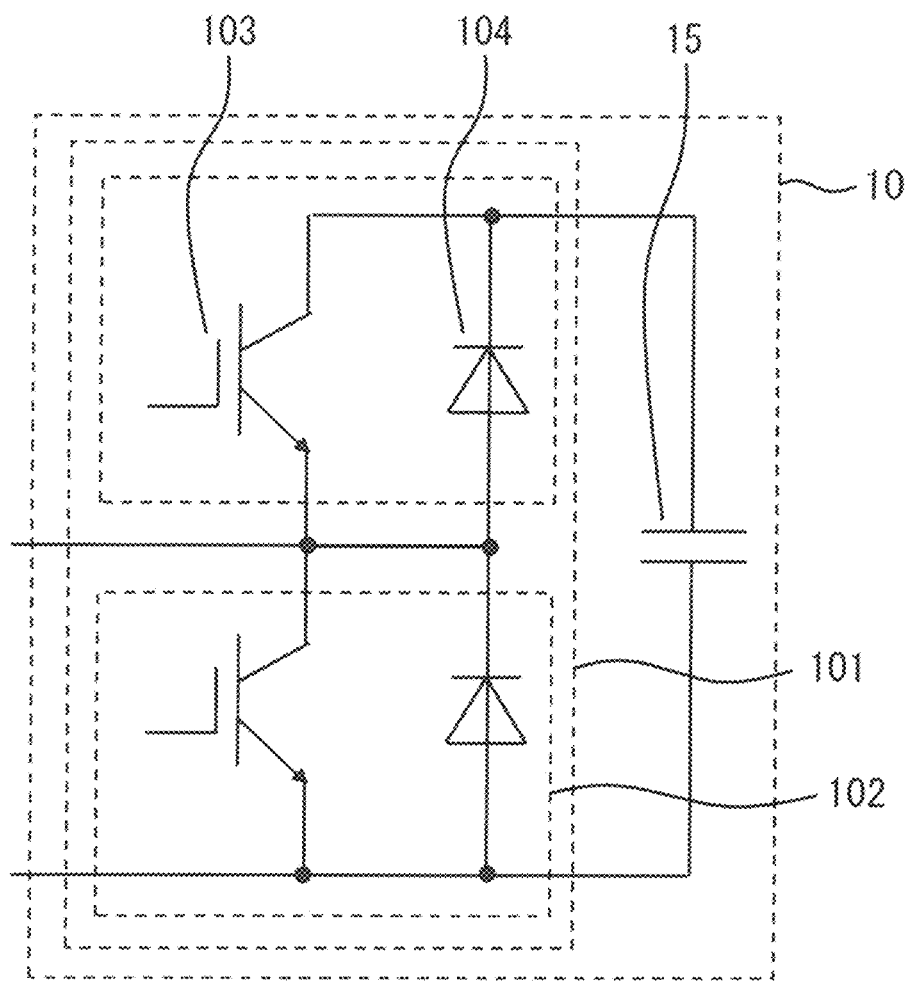
FIG. 4 is a circuit diagram showing the internal configuration of another unit cell according to embodiment 1.

The configuration of the unit cell 10 is not limited to those shown in FIG. 3 and FIG. 4 as long as the unit cell 10 includes a series unit composed of semiconductor switches, and a DC capacitor connected in parallel to the series unit, and is configured to selectively output DC capacitor voltage at output ends by the semiconductor switches of the series unit.

Hereinafter, the "unit cell" may be referred to as "cell".

Next, control of the reactive power compensation device 1 in the present embodiment will be described.

Figure 5:
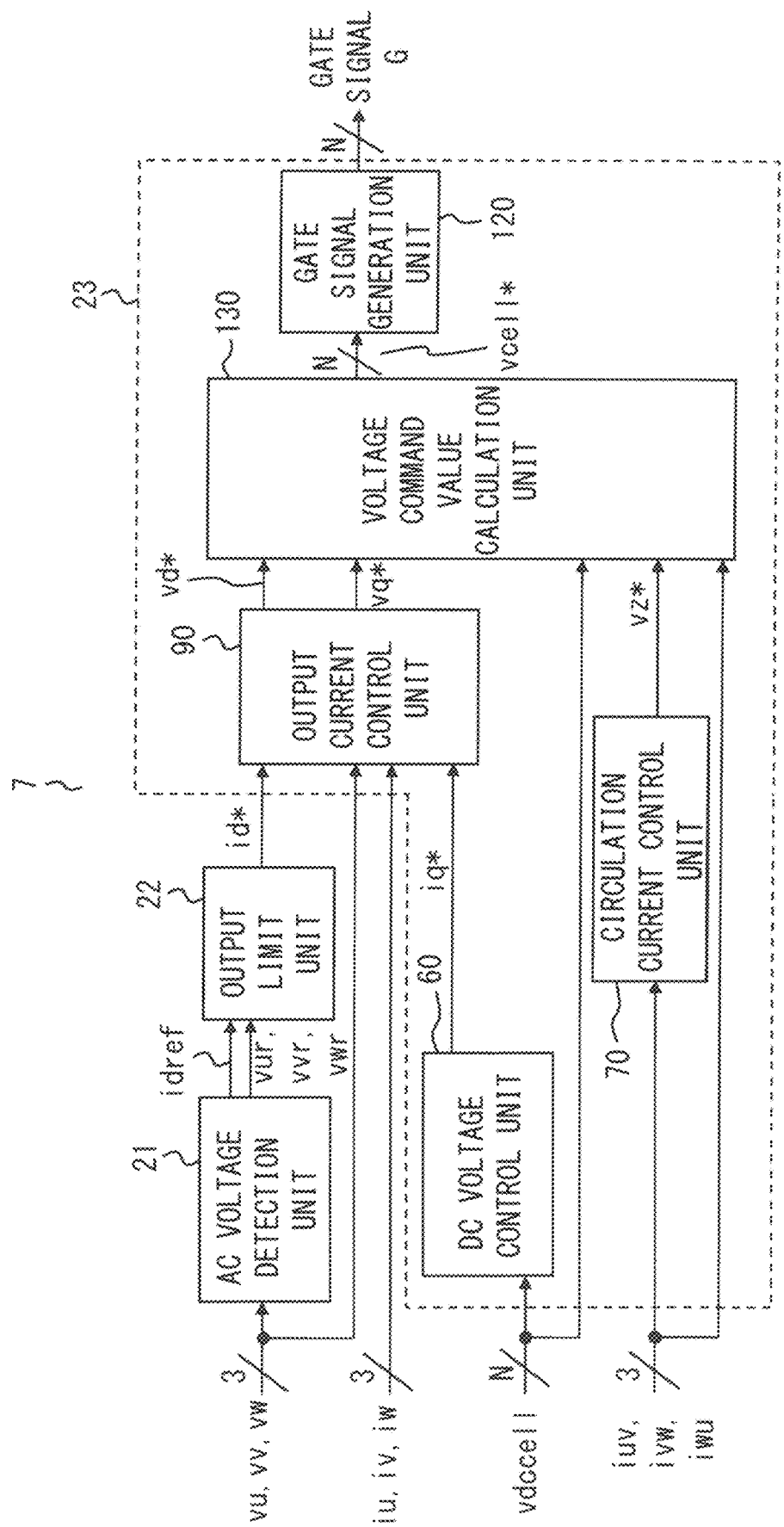
FIG. 5 is an entire block diagram showing a converter control unit for controlling the power converter according to embodiment 1.

FIG. 5 is an entire block diagram of the converter control unit 7 for controlling the power converter 6 according to embodiment 1.

The converter control unit 7 includes, as main components, an AC voltage detection unit 21, an output limit unit 22, a DC voltage control unit 60, a circulation current control unit 70, an output current control unit 90, a voltage command value calculation unit 130, and a gate signal generation unit 120. A function block including the DC voltage control unit 60, the circulation current control unit 70, the output current control unit 90, the voltage command value calculation unit 130, and the gate signal generation unit 120, corresponds to the gate signal calculation unit 23.

Figure 6:
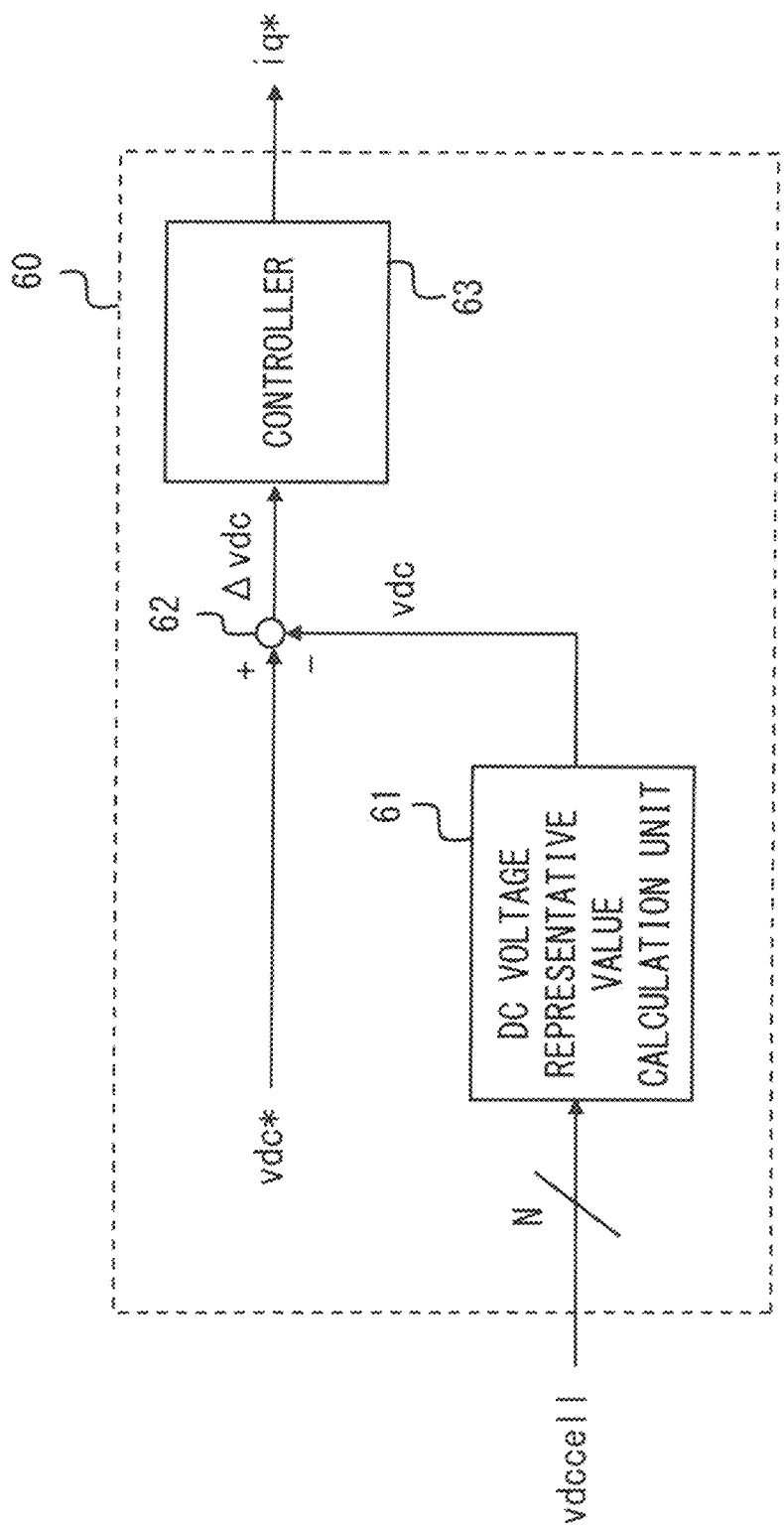
FIG. 6 is a block diagram showing the internal configuration of a DC voltage control unit according to embodiment 1.

FIG. 6 is a block diagram showing the internal configuration of the DC voltage control unit 60 in the gate signal calculation unit 23 of embodiment 1.

As shown in FIG. 6, the DC voltage control unit 60 includes a DC voltage representative value calculation unit 61, a subtractor 62, and a controller 63.

The DC voltage control unit 60 receives all cell DC capacitor voltages vdccell detected by the DC capacitor voltage detectors 50 of all (here, N) unit cells 10.

In the DC voltage control unit 60, the DC voltage representative value calculation unit 61 calculates a voltage representative value vdc such as the average value, the maximum value, or the minimum value of all the cell DC capacitor voltages, from all the cell DC capacitor voltages vdccell. The subtractor 62 calculates a deviation Δvdc between a DC all voltage command value vdc* and the voltage representative value vdc calculated by the DC voltage representative value calculation unit.

The controller 63 calculates an active current command value iq* so that the calculated deviation Δvdc becomes zero, i.e., the voltage representative value vdc of all the cell DC capacitors follows the DC all voltage command value vdc*.

By using the average value, the maximum value, the minimum value, or the like of all the cell DC capacitor voltages as the voltage representative value vdc, the DC capacitor voltages of all the cells are controlled to be constant.

Figure 7:
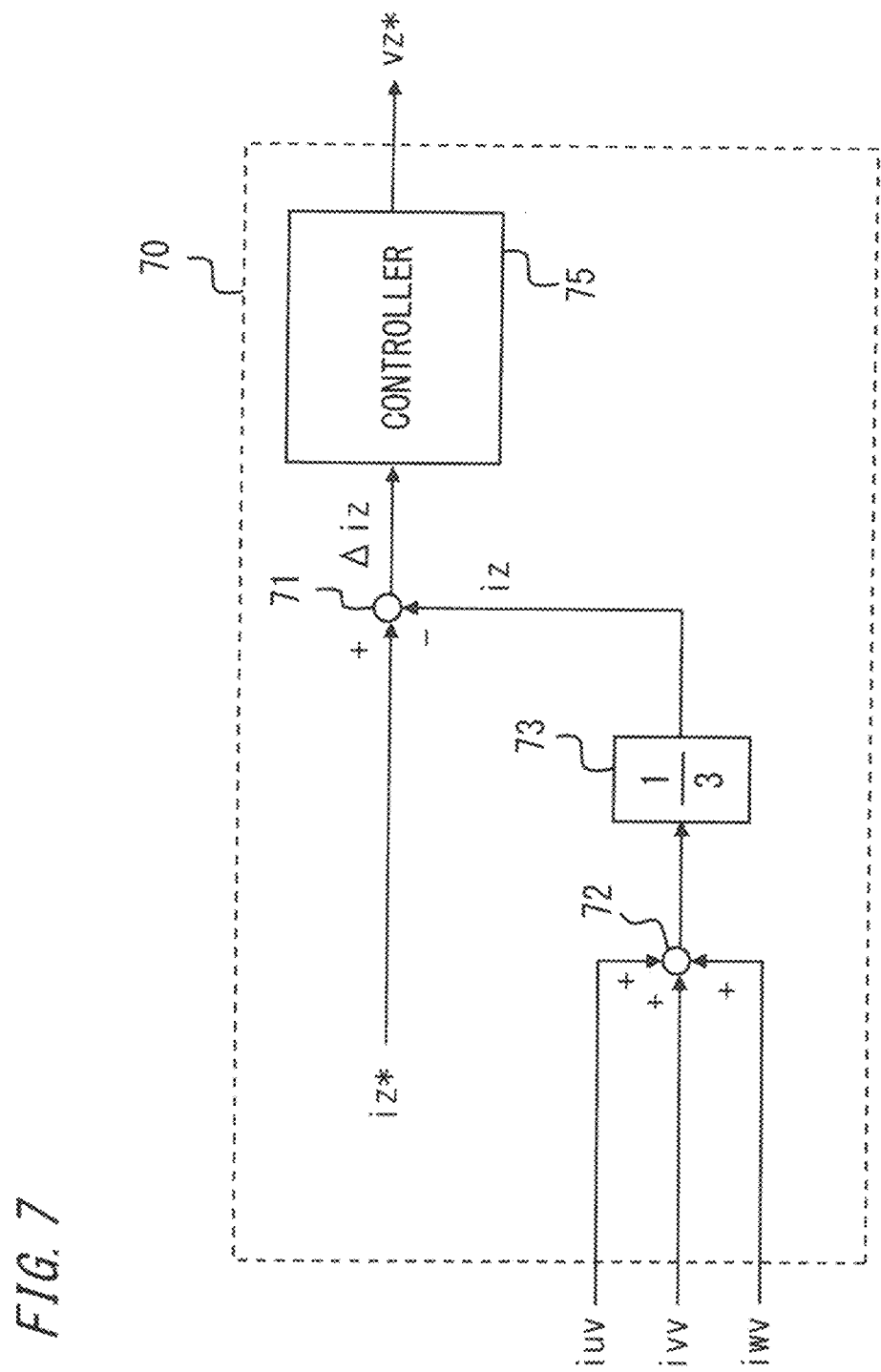
FIG. 7 is a block diagram showing the internal configuration of a circulation current control unit according to embodiment 1.

FIG. 7 is a block diagram showing the internal configuration of the circulation current control unit 70 in embodiment 1.

The circulation current control unit 70 controls current circulating through the arms 4 for the respective phases of the power converter 6, thereby balancing the DC capacitor voltages among the phases.

As shown in FIG. 7, the circulation current control unit 70 includes a subtractor 71, an adder 72, a multiplier 73, and a controller 75.

In the circulation current control unit 70, arm current values iuv, ivv, iwv detected by the atm current detectors 40 are added by the adder 72, and the resultant value is multiplied by ⅓ by the multiplier 73, to calculate circulation current iz.

The subtractor 71 calculates a deviation Δiz between a circulation current command value iz* and the circulation current iz. The circulation current command value iz* is a fixed value or a value for balancing DC capacitor voltages among the phases.

The controller 75 calculates a zero-phase-sequence voltage command value vz* so that the deviation Δiz becomes zero, i.e., the circulation current iz follows the circulation current command value iz*.

Next, of the converter control unit 7, the AC voltage detection unit 21 and the output limit unit 22 which are major parts of embodiment 1 will be described.

Figure 8:
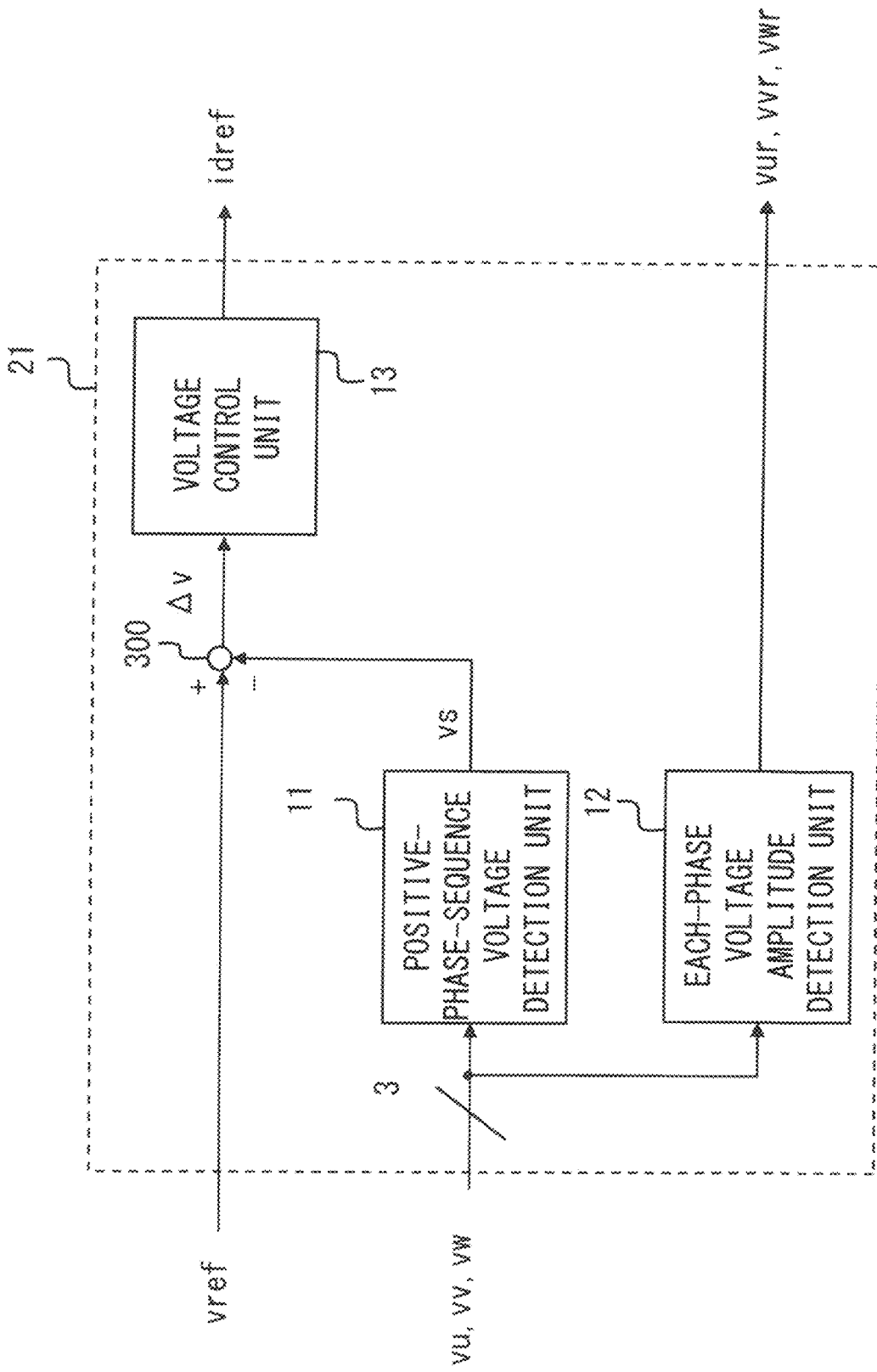
FIG. 8 is a block diagram sowing the internal configuration of an AC voltage detection unit according to embodiment 1.

FIG. 8 is a block diagram showing the internal configuration of the AC voltage detection unit 21 according to embodiment 1.

As shown in FIG. 8, the AC voltage detection unit 21 includes a positive-phase-sequence voltage detection unit 11, an each-phase voltage amplitude detection unit 12, a voltage control unit 13, and a subtract 300.

The positive-phase-sequence voltage detection unit 11 calculates positive-phase-sequence voltage from grid voltage detected by the voltage detector 20. The AC power grid 2 has three phases of u phase, v phase, and w phase, and instantaneous voltages thereof are denoted by vu, vv, vw. In this case, the positive-phase-sequence voltage detection unit 11 calculates positive-phase-sequence voltage vs on the basis of the following Expression (1).

$$vs = (vu^2 + vv^2 + vw^2)^{1/2} \qquad \text{Expression (1)}$$

The AC voltage detection unit 21 receives a voltage command value vref (command value for voltage effective value) for the power converter 6, and the positive-phase-sequence voltage vs calculated by the positive-phase-sequence voltage detection unit 11 is subtracted from the voltage command value vref by the subtractor 300, to calculate a deviation Δv, and the deviation Δv is inputted to the voltage control unit 13.

The voltage control unit 13 is formed by, for example, a proportional integral (PI) controller, and calculates a reactive current reference value idref for reducing the inputted deviation Δv.

The each-phase voltage amplitude detection unit 12 of the AC voltage detection unit receives the voltages vu, vv, vw of the AC power grid 2, and detects voltage amplitude values vur, vvr, vwr for the respective phases on the basis of the following Expression (2).

[Mathematical 1]

$$vur = \sqrt{\frac{1}{T}\int_0^T vu^2 dt} \qquad (2)$$

$$vvr = \sqrt{\frac{1}{T}\int_0^T vv^2 dt}$$

$$vwr = \sqrt{\frac{1}{T}\int_0^T vw^2 dt}$$

Figure 9:
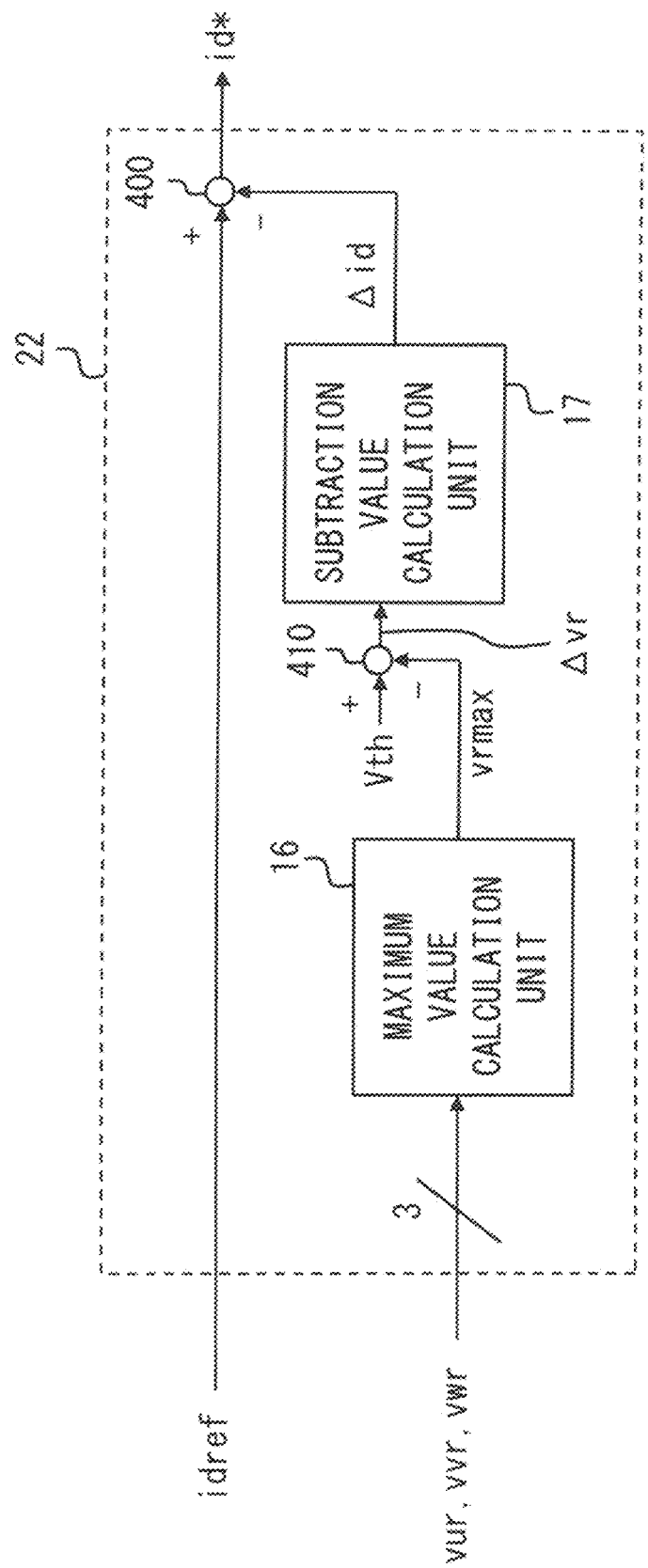
FIG. 9 is a block diagram showing the internal configuration of an output limit unit according to embodiment 1.

FIG. 9 is a block diagram showing the internal configuration of the output limit unit 22 according to embodiment 1.

The output limit unit 22 includes a maximum value calculation unit 16, a subtraction value calculation unit 17, and subtractors 400, 410.

The maximum value calculation unit. 16 calculates a maximum value vrmax of the voltage amplitude values for the respective phases, on the basis of the voltage amplitude values vur, vvr, vwr for the respective phases detected by the each-phase voltage amplitude detection unit 12 of the AC voltage detection unit 21. Then, the subtractor 410 subtracts the maximum value vrmax of the voltage amplitudes for the respective phases calculated by the maximum value calculation unit 16, from a predetermined voltage maximum allowable value Vth, to calculate a deviation Δvr. Here, the voltage maximum allowable value Vth is determined by the specifications of the reactive power compensation device 1 and is the maximum voltage that the power converter 6 can output.

Next, the subtraction value calculation unit 17 calculates a reactive current subtraction amount $\Delta id$ for reducing the deviation $\Delta vr$. In a case where the deviation $\Delta vr$ is a positive value, the reactive current subtraction amount $\Delta id$ is set to zero.

Next, the subtractor 400 subtracts the reactive current subtraction amount $\Delta id$ from the reactive current reference value idref calculated by the voltage control unit 13 of the AC voltage detection unit 21, to calculate a reactive current command value id*.

As described above, the output limit unit 22 calculates the maximum value vrmax of the voltage amplitude values for the respective phases, on the basis of the voltage amplitude values for the respective phases detected by the each-phase voltage amplitude detection unit 12, and determines whether or not the output reactive power of the power converter 6 needs to be limited, on the basis of the maximum value vrmax of the voltage amplitude values for the respective phases.

Next, the configuration and operation of the output current control unit 90 of the converter control unit 7 will be described with reference to FIG. 10.

Figure 10:
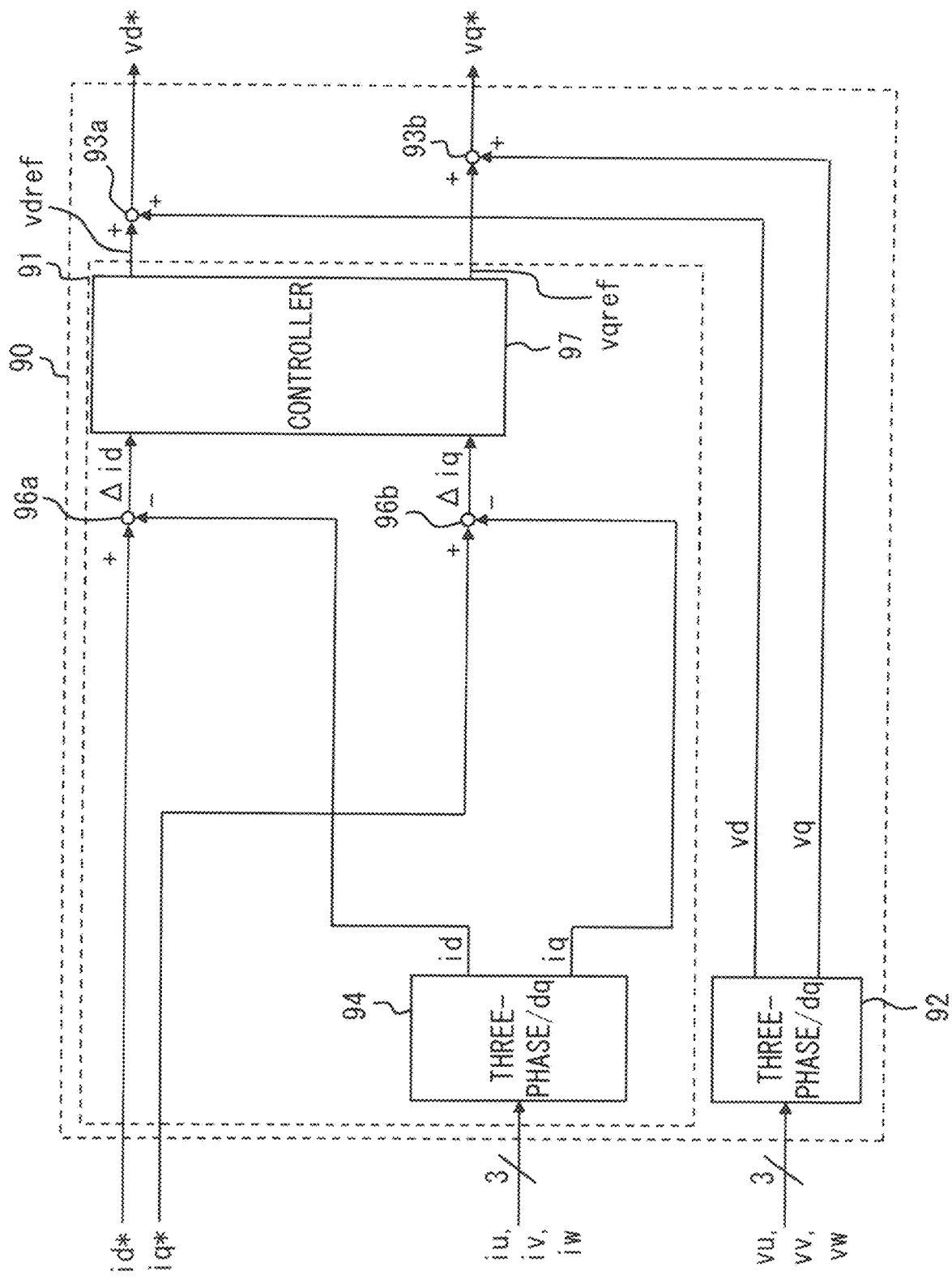
FIG. 10 is a block diagram showing the internal configuration of an output current control unit according to embodiment 1.

FIG. 10 is a block diagram showing the internal configuration of the output current control unit 90 according to embodiment 1.

In the output current control unit 90, active current iq and reactive current id are controlled, thereby performing power control of the power converter 6. The output current control unit 90 receives the active current command value iq* and the reactive current command value id*. The active current command value iq* is calculated by the OC voltage control unit 60 as described above, and the reactive current command value id* is calculated by the output limit unit 22 as described above.

As shown in FIG. 10, the output current control unit 90 includes a reference voltage calculation unit 91, a three-phase/two-phase coordinate conversion unit 92, and adders 93a, 93b. The reference voltage calculation unit 91 includes a three-phase/two-phase coordinate conversion unit 94, subtractors 96a, 96b, and a controller 97.

The three-phase/two-phase coordinate conversion unit 94 performs three-phase/two-phase conversion of the AC currents iu, iv, iw detected by the current detector 30, in a positive-phase-sequence coordinate system, to calculate reactive current id and active current iq.

The subtractor 96a calculates a deviation $\Delta id$ between the reactive current command value id* and the reactive current id.

The subtractor 96b calculates a deviation $\Delta iq$ between the active current command value iq* and the active current iq.

The controller 97 is formed by, for example, a PI controller, and calculates reference voltages vdref, vqref so that each of the deviation $\Delta id$ and the deviation $\Delta iq$ becomes zero, i.e., the reactive current id follows the reactive current command value id* and the active current iq follows the active current command value iq*.

The three-phase/two-phase coordinate conversion unit 92 performs three-phase/two-phase conversion of the grid voltages vu, vv, vw detected by the voltage detector 20, in a positive-phase-sequence coordinate system, to calculate positive-phase-sequence voltages vd, vq.

Then, the output current control unit 90 adds the positive-phase-sequence voltages vd, vq to the reference voltages vdref, vqref outputted from the controller 97, in a feedforward manner, by the adders 93a, 93b, to calculate voltage command values vd*, vq*.

Next, the configuration and operation of the voltage command value calculation unit 130 of the converter control unit 7 will be described with reference to FIG. 11 and FIG. 12.

Figure 11:
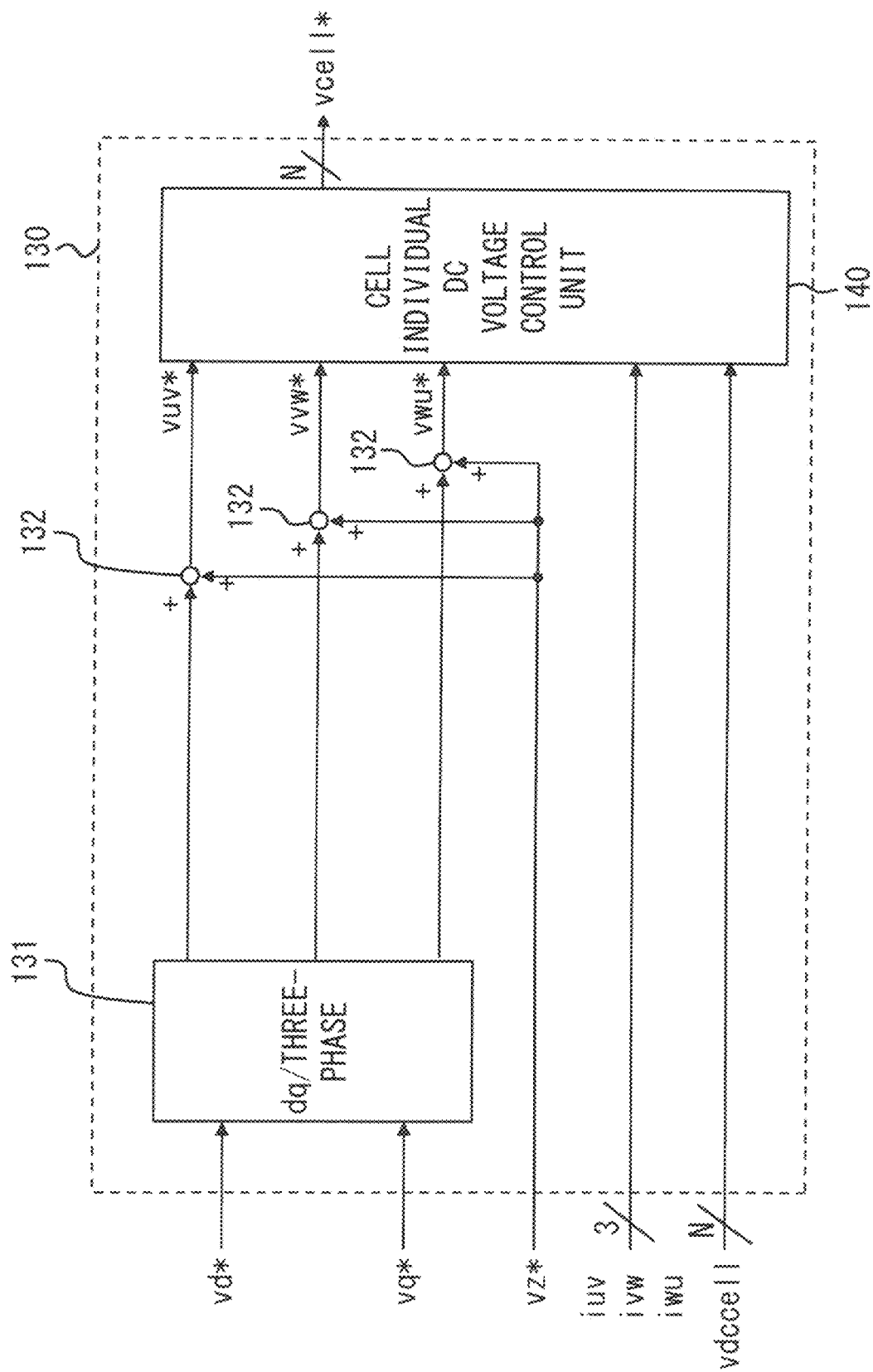
FIG. 11 is a block diagram showing the internal configuration of a voltage command value calculation unit according to embodiment 1.

FIG. 11 is a block diagram showing the internal configuration of the voltage command value calculation unit 130 according to embodiment 1.

The voltage command value calculation unit 130 includes a two-phase/three-phase coordinate conversion quit 131, adders 132, and a cell individual DC voltage control unit 140. The internal configuration of the cell individual DC voltage control unit 140 will be described later.

First, the two-phase/three-phase coordinate conversion unit 131 converts the voltage command values vd*, vq* to values for three phases, in a positive-phase-sequence coordinate system. The adders 132 add the zero-phase-sequence voltage command value vz* to the respective voltage command values for three phases converted by the two-phase/three-phase coordinate conversion unit 131, to calculate arm voltage command values vuv*, vvw*, vwv* for the respective phases.

The cell individual DC voltage control unit 140 calculates respective output voltage command values vcell* for all the unit cells 10, on the basis of the arm voltage command values vuv*, vvw*, vwu* and the arm currents iuv, ivw, iwu for the respective phases, and the respective cell DC voltages vdccell.

Figure 12:
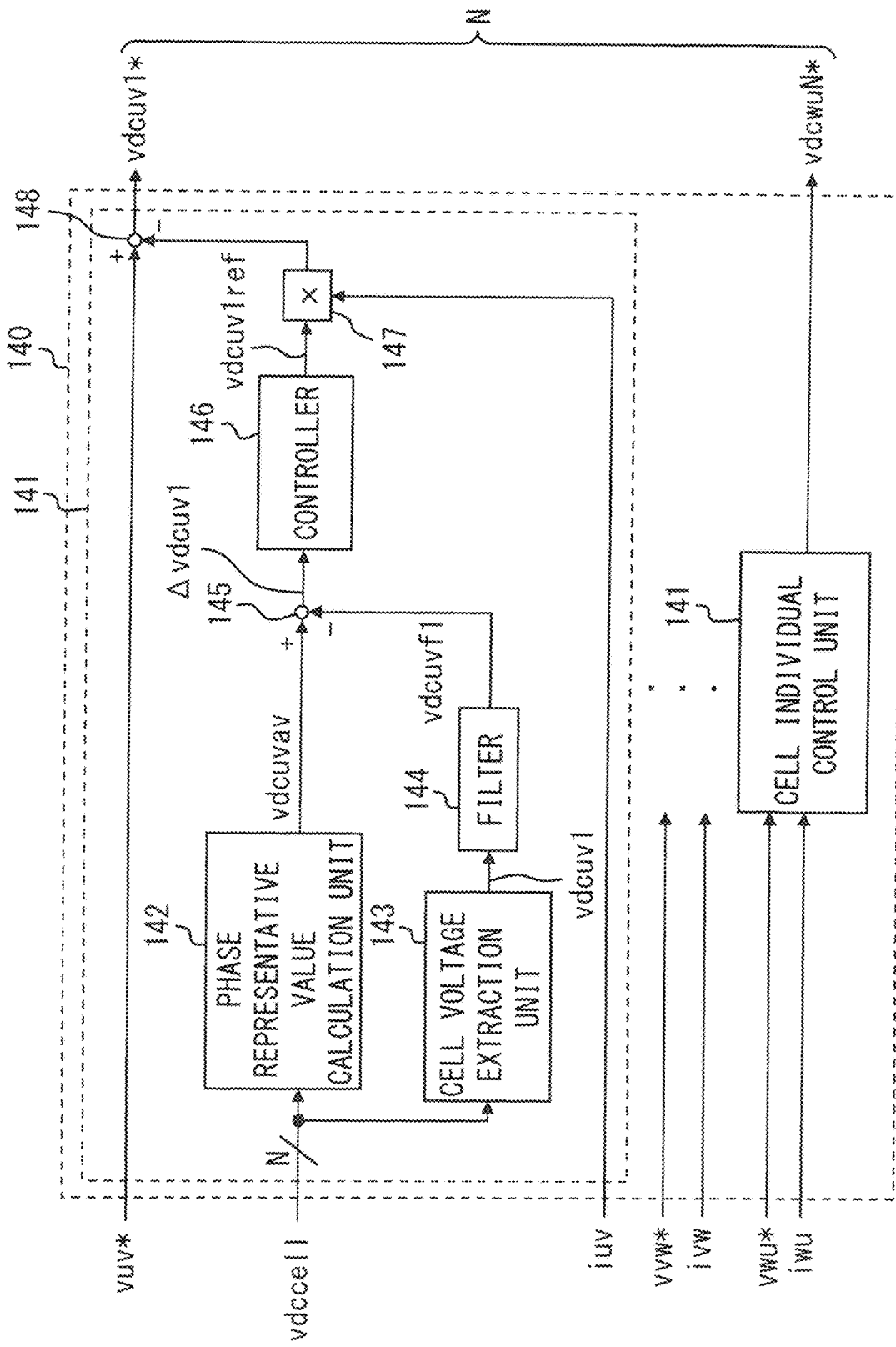
FIG. 12 is a block diagram showing the internal configuration of a cell individual DC voltage control unit according to embodiment 1.

FIG. 12 is a block diagram showing the internal configuration of the cell individual DC voltage control unit according to embodiment 1.

The cell individual DC voltage control unit 140 includes N cell individual control units 141 corresponding to the number of cells. Each cell individual control unit 141 includes a phase representative value calculation unit 142, a cell voltage extraction unit 143, a filter 144, subtractors 145, 148, a controller 146, and a multiplier 147.

In the cell individual control unit 141, the phase representative value calculation unit 142 calculates a phase voltage representative value vdcuvav such as the average value, the maximum value, or the minimum value of the DC capacitor voltages for each phase, from the respective cell DC voltages vdccell. The cell voltage extraction unit 143 calculates individual cell DC voltage vdcuv1 from the respective cell DC voltages vdccell. The filter 144 removes an AC component having a frequency 2f from the individual cell ADC voltage vdcuv1, to calculate vdcuvf1. The subtractor 145 subtracts vdcuvf1 from the phase voltage representative value vdcuvav, to calculate a deviation $\Delta vdcuv1$. The controller 145 calculates a control output vdcuv1ref so that the calculated deviation $\Delta vdcuv1$ becomes zero.

Further, the multiplier 147 multiplies the control output vdcuv1ref by the arm current iuv for the same phase as the control output vdcuv1ref. The subtractor 148 subtracts the output of the multiplier 147 from the phase arm voltage command value vuv*, to calculate a cell DC voltage command value vdcuv1*. Respective cell DC voltage command values vdcuv1* to vdcwuN* in FIG. 12 are the output voltage command values vcell* for the respective cells in FIG. 5 and FIG. 11.

Returning to FIG. 5, the gate signal generation unit 120 calculates the gate signal G for controlling ON and OFF driving of the switching element 103 in each cell so as to perform pulse width modulation (PWM) control on the basis of the output voltage command value vcell* for each cell outputted from the voltage command value calculation unit 130.

In the above description of the embodiment, the AC voltage detection unit 21 includes the each-phase voltage amplitude detection unit 12 for detecting the voltage amplitude values vur, vvr, vwr for the respective phases of grid voltage of the AC power grid 2, and the output limit unit 22 calculates the maximum value vrmax of the voltage amplitude values for the respective phases on the basis of the voltage amplitude values for the respective phases detected by the each-phase voltage amplitude detection unit 12, and determines whether or not the output reactive power of the power converter 6 needs to be limited, on the basis of the maximum value vrmax of the voltage amplitude values for the respective phases.

However, the AC voltage detection unit 21 may detect the effective values of voltages for the respective phases of grid voltage of the AC power grid 2, and the output limit unit 22 may calculate the maximum value of the effective values of the voltages for the respective phases detected by the AC voltage detection unit 21, and determine whether or not the output reactive power of the power converter 6 needs to be limited, on the basis of the maximum value of the effective values of the voltages for the respective phases.

As described above, in the present embodiment, the reactive power compensation device includes a power converter connected to an AC power grid with a plurality of phases, and having a self-turn-off switching element, and a converter control unit which controls the switching element of the power converter. Reactive power of the AC power grid is compensated by output reactive power of the power converter.

The converter control unit includes an AC voltage detection unit and an output limit unit.

The AC voltage detection unit detects voltage information of the AC power grid to which the power converter is connected.

The output limit unit determines whether or not the output reactive power of the power converter needs to be limited, on the basis of the voltage information detected by the AC voltage detection unit, and in a case where the output reactive power needs to be limited, limits the output reactive power of the power converter.

Thus, with the reactive power compensation device of the present embodiment, for example, in such a case of being interconnected to an AC power grid having a small short-circuit capacity, when unbalance failure occurs in the power grid and the voltage amplitude for a sound phase of the grid voltage increases due to output of reactive power, by limiting the reactive power to be outputted, a control margin of the reactive power compensation device can be ensured and the reactive power compensation device can be prevented from being stopped for protection due to overvoltage or overcurrent.

In addition, in the case where the output reactive power needs to be limited, the output limit unit limits the output reactive power of the power converter so that output voltage of the power converter is kept within an output possible range of the power converter.

Thus, it is possible to ensure a control margin of the reactive power compensation device.

In addition, in the case where the output reactive power of the power converter needs to be limited, the output limit unit limits output reactive current of the power converter. Thus, control of the reactive power compensation device is facilitated.

In addition, the AC voltage detection unit includes a positive-phase-sequence voltage detection unit for detecting positive-phase-sequence voltage of grid voltage of the AC power grid, and calculates a reactive current reference value on the basis of the positive-phase-sequence voltage detected by the positive-phase-sequence voltage detection unit and a voltage command value for the power converter.

The output limit unit subtracts a reactive current subtraction amount from the reactive current reference value, to calculate a reactive current command value, thus limiting the output reactive current of the power converter. Thus, control of the reactive power compensation device is facilitated.

In addition, the AC voltage detection unit detects magnitudes (e.g., voltage amplitude values or voltage effective values for the respective phases) of voltages for the respective phases of grid voltage of the AC power grid, and the output limit unit calculates a maximum value among the magnitudes of the voltages for the respective phases detected by the AC voltage detection unit, and determines whether or not the output reactive power of the power converter needs to be limited, on the basis of the maximum value among the magnitudes of the voltages for the respective phases.

Thus, whether or not the output reactive power of the power converter needs to be limited can be easily determined and a control margin of the reactive power compensation device can be ensured.

In addition, the output limit unit calculates the maximum value among the magnitudes of the voltages for the respective phases detected by the AC voltage detection unit, calculates a deviation between the maximum value and a predetermined voltage maximum allowable value, and calculates a reactive current subtraction amount for reducing the deviation, thus limiting output reactive current of the power converter.

Thus, control of the reactive power compensation device is facilitated and a control margin of the reactive power compensation device can be ensured.

Further, the power converter includes three arms connected to the AC power grid,
 each of the arms is formed such that one unit cell or a plurality of unit cells connected in cascade, and a reactor, are connected in series, and
 the unit cell includes a series unit composed of a plurality of the switching elements connected in series to each other, and a DC capacitor connected in parallel to the series unit.

In addition, the three arms are delta-connected.

In addition, for example, the unit cell has a full-bridge configuration in which a plurality of the series units each composed of the switching elements are connected in parallel.

Thus, it is possible to obtain the power converter interconnected to the AC power grid and having a large capacity and high withstand voltage.

Embodiment 2

A reactive power compensation device of embodiment 2 is configured such that the subtraction value calculation unit in the output limit unit of the reactive power compensation device of embodiment 1 is changed.

Hereinafter, the configuration and operation of the reactive power compensation device of embodiment 2 will be described focusing on difference from embodiment 1, and description of the same parts as in embodiment 1 is omitted as appropriate.

Figure 13:
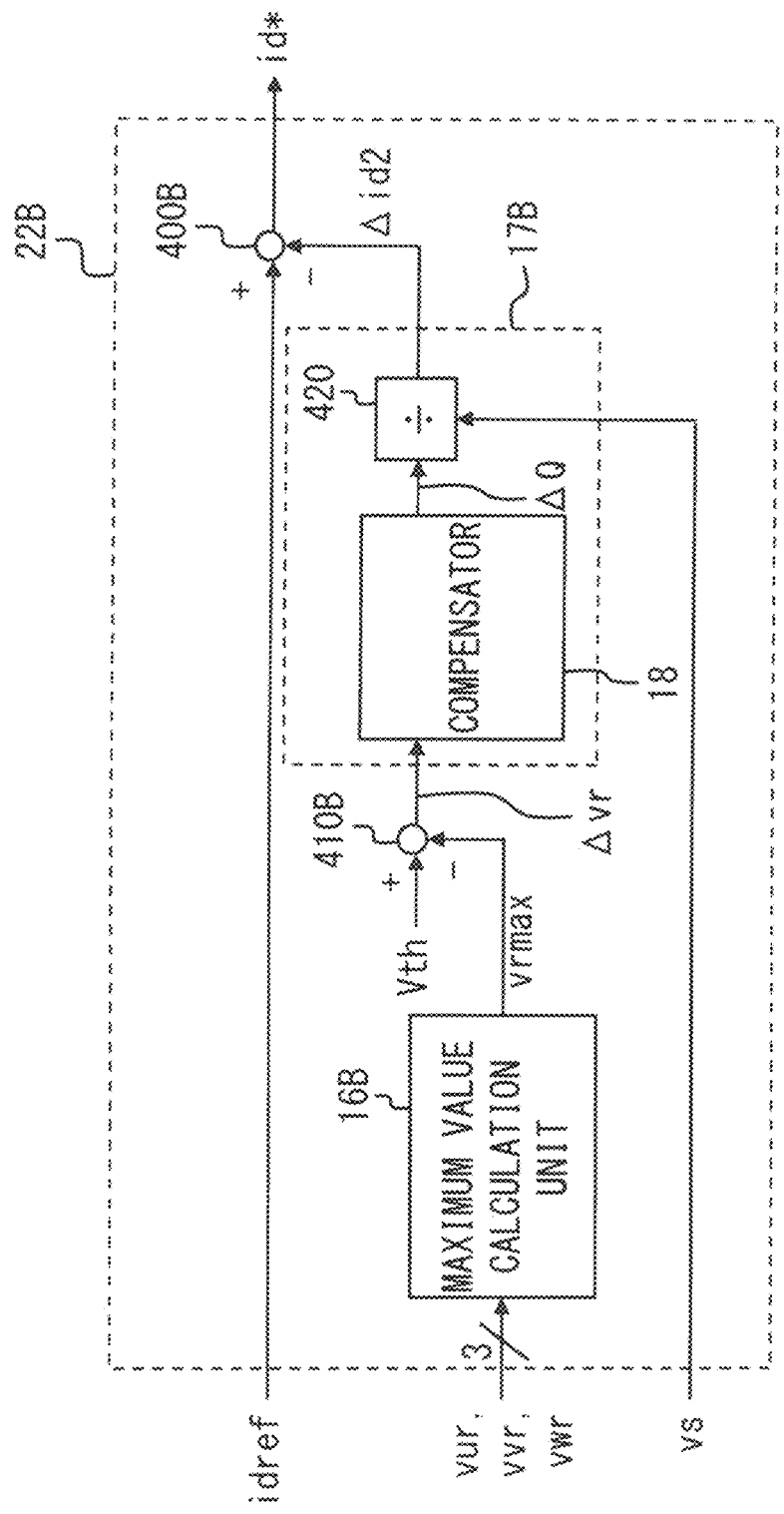
FIG. 13 shows the internal configuration of an output limit unit according to embodiment 2.

FIG. 13 is a block diagram showing the internal configuration of an output limit unit 22B according to embodiment 2.

The output limit unit 22B of embodiment 2 includes a maximum value calculation unit 16B, a subtraction value calculation unit 17B, a subtractor 400B, and a subtractor 410B. Further, the subtraction value calculation unit 17B includes a compensator 18 and a divider 420.

As in embodiment 1, the maximum value calculation unit 16B calculates the maximum value vrmax of the voltage amplitude values for the respective phases, on the basis of the voltage amplitude values vur, vvr, vwr for the respective phases calculated by the each-phase voltage amplitude detection unit 12 of the AC voltage detection unit 21. Then, the subtractor 410B subtracts the maximum value vrmax of the voltage amplitudes for the respective phases calculated by the maximum value calculation unit 16B, from the predetermined voltage maximum allowable value Vth, to calculate the deviation Δvr.

In embodiment 2, the compensator 18 of the subtraction value calculation unit 17B receives the deviation Δvr obtained by subtracting the maximum value vrmax of the voltage amplitudes for the respective phases from the voltage maximum allowable value Vth, and calculates a reactive power subtraction amount ΔQ for reducing the deviation Δvr. In a case where the reactive power subtraction amount ΔQ is a reactive power amount corresponding to capacitive operation (capacitive reactive power), the reactive power subtraction account ΔQ is set to be such a subtraction amount that makes the output reactive power be zero. Here, as reactive power, there are two polarities of capacitive reactive power (capacitive operation) and inductive reactive power (inductive operation). When the AC grid voltage is lower than the reference value, the reactive power compensation device 1 operates in a direction to increase voltage, thus outputting capacitive reactive power. When the AC grid voltage is higher than the reference value, the reactive power compensation device 1 operates in a direction to decrease voltage, thus outputting inductive reactive power. Accordingly, when unbalance failure occurs in the power grid and voltage for a sound phase of the grid voltage increases, the voltage excessively increases in a case of the capacitive reactive power, and therefore the reactive power subtraction amount ΔQ is set to be such a subtraction amount that mates the output reactive power be zero, so as not to output reactive power.

Next, the divider 420 divides the reactive power subtraction amount ΔQ calculated by the compensator 18, by the positive-phase-sequence voltage vs calculated by the AC voltage detection unit 21, to calculate a reactive current subtraction amount Δid2.

Finally, the subtractor 400B subtracts the reactive current subtraction amount Δid2 from the reactive current reference value idref, to calculate the reactive current command value id*.

The other configurations and operations are the same as those in embodiment 1.

As described above, according to the present embodiment, as in embodiment 1, for example, in such a case of being interconnected to the AC power grid having a small short-circuit capacity, when unbalance failure occurs in the power grid and the voltage amplitude for a sound phase of the grid voltage increases due to output of reactive power, by limiting the reactive power to be outputted, a control margin of the reactive power compensation device can be ensured and the reactive power compensation device can be prevented from being stopped for protection due to overvoltage or overcurrent.

In addition, the output limit unit calculates the maximum value among the magnitudes of the voltages for the respective phases detected by the AC voltage detection unit, calculates a deviation between the maximum value and a predetermined voltage maximum allowable value, and calculates a reactive power subtraction amount for reducing the deviation, thus limiting output reactive current of the power converter.

Thus, control of the reactive power compensation device is facilitated and a control margin of the reactive power compensation device can be ensured.

Embodiment 3

Next, a reactive power compensation device 1 according to embodiment 3 will be described.

In the reactive power compensation device 1 according to embodiment 3, the configurations and operations other than those of an AC voltage detection unit 21C and an output limit unit 22C are the same as in embodiment 1. Description of the same parts as in embodiments 1 and 2 is omitted as appropriate.

Figure 14:
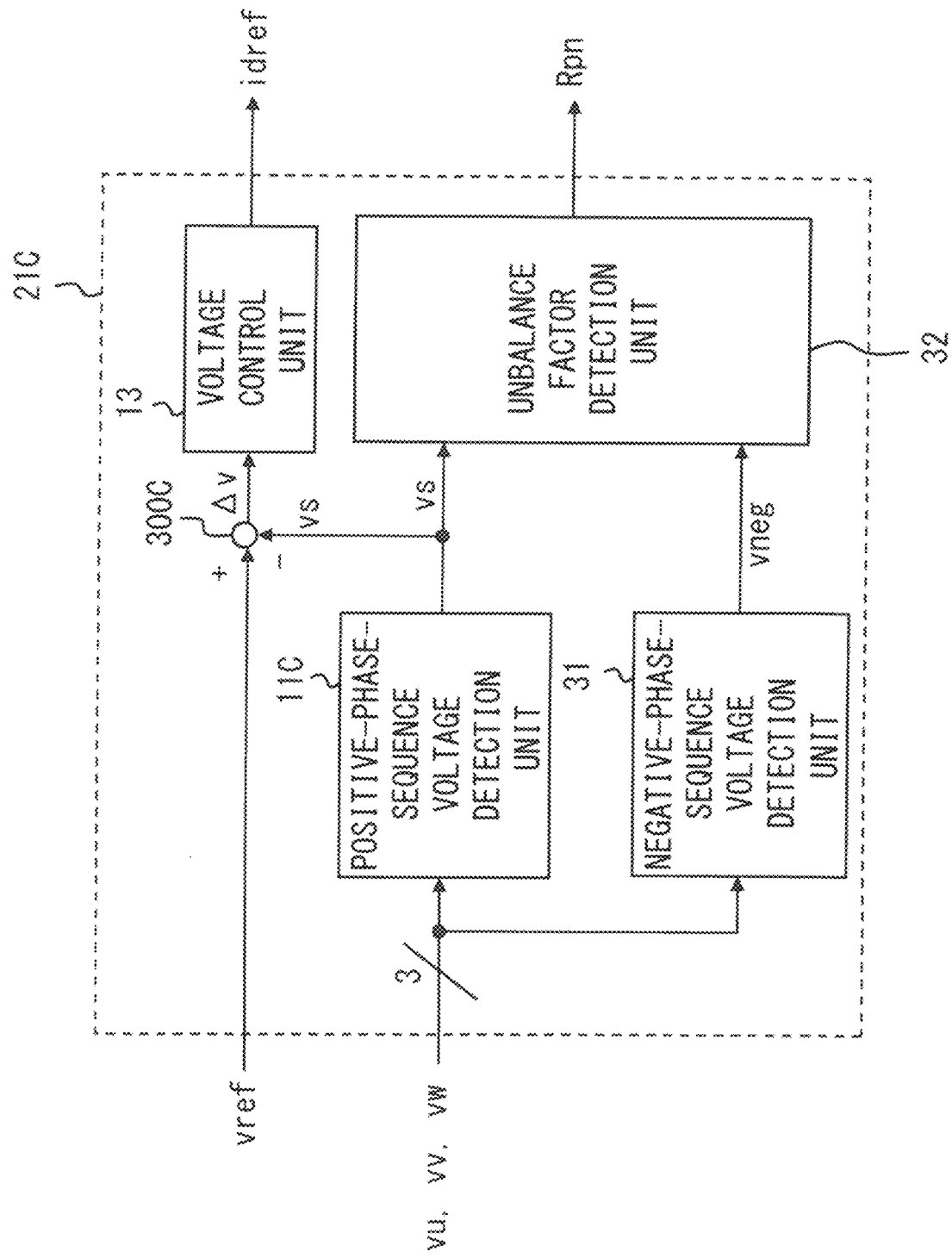
FIG. 14 is a block diagram showing the internal configuration of an AC voltage detection unit according to embodiment 3.
Figure 15:
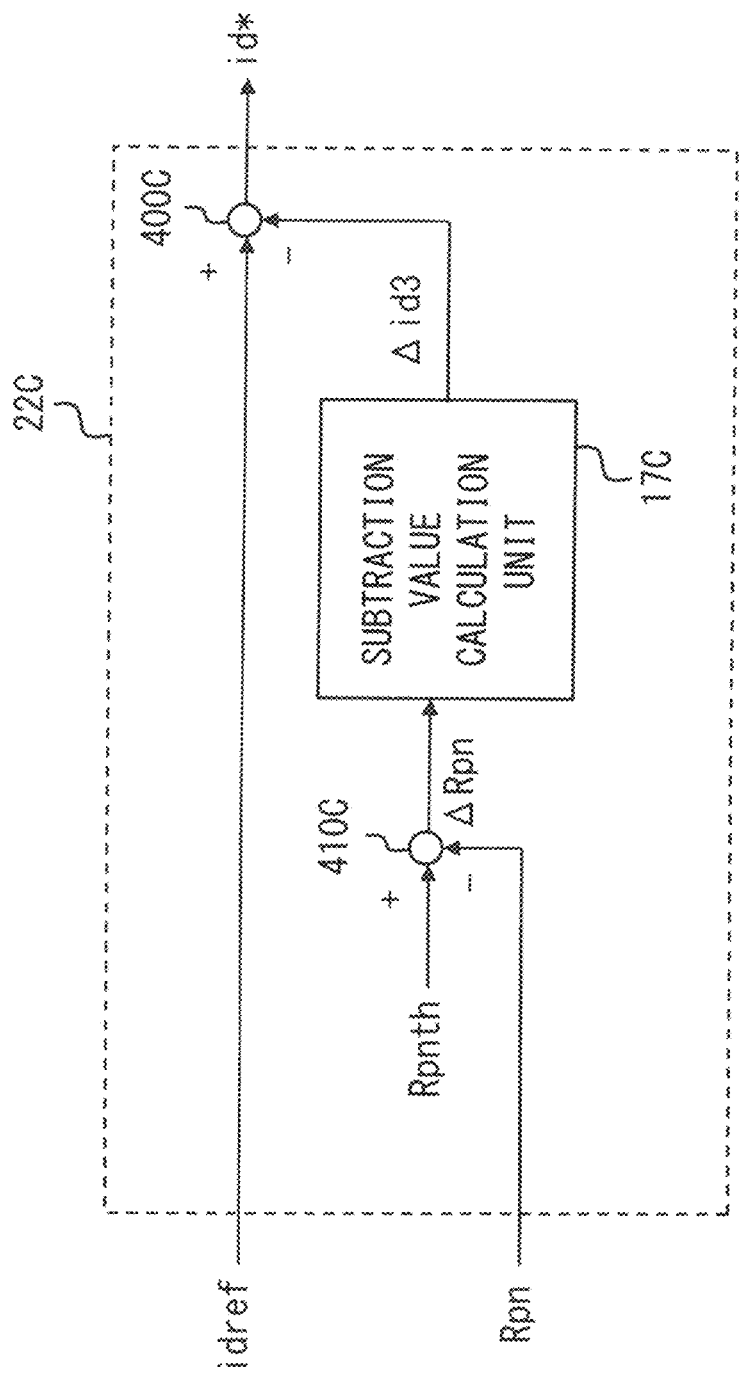
FIG. 15 is a block diagram showing the internal configuration of an output limit unit according to embodiment 3.

Here, the AC voltage detection unit 21C and the output limit unit 22C according to embodiment 3 will be described. FIG. 14 is a block diagram showing the internal configuration of the AC voltage detection unit 21C according to embodiment 3, and FIG. 15 is a block diagram showing the internal configuration of the output limit unit 22C according to embodiment 3.

First, the AC voltage detection unit 21C according to embodiment 3 will be described with reference to FIG. 14.

The AC voltage detection unit 21C of embodiment 3 includes a positive-phase-sequence voltage detection unit 11C, a negative-phase-sequence voltage detection unit 31, the voltage control unit 13, an unbalance factor detection unit 32, and a subtractor 300C.

As in embodiment 1, the positive-phase-sequence voltage detection unit 11C calculates the positive-phase-sequence voltage vs on the basis of the instantaneous voltages vu, vv, vw detected by the voltage detector 20.

The negative-phase-sequence voltage detection unit 31 calculates negative-phase-sequence voltage vneg by a rotating coordinate conversion method or the like on the basis of the instantaneous voltages vu, vv, vw detected by the voltage detector 20.

The positive-phase-sequence voltage vs calculated by the positive-phase-sequence voltage detection unit 11C and the negative-phase-sequence voltage vneg calculated by the negative-phase-sequence voltage detection unit 31 are inputted to the unbalance factor detection unit 32.

The unbalance factor detection unit 32 calculates an unbalance factor Rpn(=vneg/vs) which is the ratio of the negative-phase-sequence voltage vneg to the positive-phase-sequence voltage vs.

The operation of the AC voltage detection unit 21C other than the above operation is the same as in embodiment 1. That is, the AC voltage detection unit 21C receives the voltage command value vref (command value for voltage effective value) for the power converter 6, and subtracts the positive-phase-sequence voltage vs calculated by the positive-phase-sequence voltage detection unit 11 from the voltage command value vref by the subtractor 300C, to calculate the deviation Δv, and the deviation Δv is inputted to the voltage control unit 13.

The voltage control unit 13 is formed by, for example, a proportional integral (PI) controller, and calculates the reactive current reference value idref for reducing the inputted deviation Δv.

Next, the output limit unit 22C according to embodiment 3 will be described with reference to FIG. 15.

The output limit unit 22C of embodiment 3 includes a subtraction value calculation unit 17C, a subtractor 400C, and a subtractor 410C.

First, the unbalance factor Rpn calculated by the unbalance factor detection unit 32 of the AC voltage detection unit 21C is inputted to the output limit unit 22C. The subtractor 410C subtracts the unbalance factor Rpn inputted to the output limit unit 22C, from a threshold Rpnth set in advance on the basis of the impedance of the AC power grid 2, and calculates a deviation ΔRpn. Here, the threshold Rpnth will be described. When the ratio of the negative-phase-sequence voltage increases relative to the positive-phase-sequence voltage, the degree of unbalance increases. For example, in an event of a one-phase ground fault at a very close end of an infinite bus (case where the AC power grid is strong), the ratio of the positive-phase-sequence voltage is ⅔ and the ratio of the negative-phase-sequence voltage is ⅓, so that the unbalance factor Rpn is ½. Therefore, as an example, this unbalance factor (½) can be used as the threshold Rpnth.

Next, the subtraction value calculation unit 17C calculates a reactive current subtraction amount Δid3 for reducing the deviation ΔRpn. In a case where the deviation ΔRpn is a positive value, the reactive current subtraction amount Δid3, is set to zero.

Then, the subtractor 400C subtracts the reactive current subtraction amount Δid3 from the reactive current reference value idref, to calculate the reactive current command value id*. As described in embodiment 2, the reactive current subtraction amount Δid3 may be calculated by calculating a reactive power subtraction amount ΔQ3 for reducing the deviation ΔRpn and then dividing the reactive power subtraction amount ΔQ3 by the positive-phase-sequence voltage vs.

As described above, according to the present embodiment, as in embodiments 1 and 2, for example, in such a case of being interconnected to an AC power grid having a small short-circuit capacity, when unbalance failure occurs in the power grid and the voltage amplitude for a sound phase of the grid voltage increases due to output of reactive power, by limiting the reactive power to be outputted, a control margin of the reactive power compensation device can be ensured and the reactive power compensation device can be prevented from being stopped for protection due to overvoltage or overcurrent.

In addition, the AC voltage detection unit includes a positive-phase-sequence voltage detection unit for detecting positive-phase-sequence voltage of grid voltage of the AC power grid, a negative-phase-sequence voltage detection unit for detecting negative-phase-sequence voltage of the grid voltage of the AC power grid, and an unbalance factor detection unit for calculating an unbalance factor which is a ratio of the negative-phase-sequence voltage to the positive-phase-sequence voltage.

The output limit unit determines whether or not the output reactive power of the power converter needs to be limited, on the basis of the unbalance factor calculated by the unbalance factor detection unit. Thus, control of the reactive power compensation device is facilitated.

In addition, the output limit unit calculates a deviation between the unbalance factor calculated by the unbalance factor detection unit and a predetermined threshold, and calculates a reactive current subtraction amount or a reactive power subtraction amount for reducing the deviation, thus limiting output reactive current of the power converter. Thus, control of the reactive power compensation device is facilitated.

Embodiment 4

Next, a reactive power compensation device 1 according to embodiment 4 will be described.

In the reactive power compensation device 1 according to embodiment 4, the configurations other than that of a subtraction value calculation unit 17D included in an output limit unit 22D are the same as in embodiment 1. Description of the same parts as in embodiments 1 to 3 is omitted as appropriate.

Figure 16:
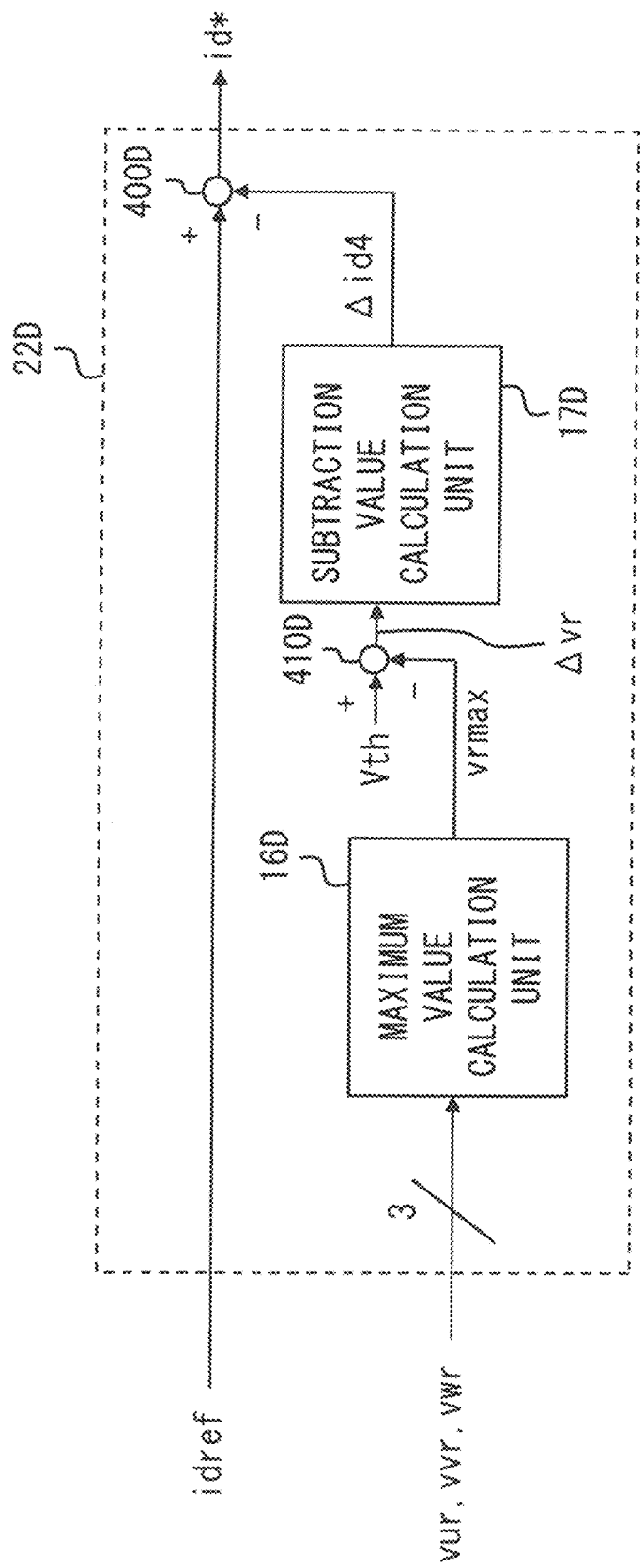
FIG. 16 is a block diagram showing the internal configuration of an output limit unit according to embodiment 4.

FIG. 16 is a block diagram showing the configuration of the output limit unit 22D according to embodiment 4.

The output limit unit 22D includes a maximum value calculation unit 16D, a subtraction value calculation unit 17D, a subtractor 400D, and a subtractor 410D.

The maximum value calculation unit 16D in FIG. 16 functions in the same manner as in embodiment 1. That is, the maximum value calculation unit 16D calculates the maximum value vrmax of the voltage amplitude values for the respective phases, on the basis of the voltage amplitude values vur, vvr, vwr for the respective phases calculated by the each-phase voltage amplitude detection unit 12 of the AC voltage detection unit 21. Then, the subtractor 410D subtracts the maximum value vrmax of the voltage amplitudes for the respective phases calculated by the maximum value calculation unit 16D, from the predetermined voltage maximum allowable value Vth, to calculate the deviation Δvr.

Then, the subtraction value calculation unit 17D calculates a reactive current subtraction amount Δid4 for reducing the deviation Δvr. In a case where the deviation Δvr is a positive value, the reactive current subtraction amount Δid4 is set to zero, and in a case where the deviation Δvr is a negative value, the reactive current subtraction amount Δid4 set in advance on the basis of the impedance of the AC power grid 2 is outputted. Here, the reactive current subtraction amount Δid4 can be set as follows. That is, the voltage increase amount with respect to the reactive current output amount can be calculated in accordance with the impedance of the AC power grid 2. The reactive current subtraction amount Δid4 is determined so that the voltage increase amount satisfies the output possible voltage range of the reactive power compensation device 1.

As described in embodiment 2, the reactive current subtraction amount Δid4 may be calculated by calculating a reactive power subtraction amount ΔQ3 for reducing the deviation Δvr and then dividing the reactive power subtraction amount ΔQ3 by the positive-phase-sequence voltage vs.

Further, as in embodiment 3, the unbalance factor Rpn inputted to the output limit unit 22C may be subtracted from the threshold Rpnth set in advance on the basis of the impedance of the AC power grid 2, to calculate the deviation ΔRpn, and the reactive current subtraction amount Δid4 may be calculated from the deviation ΔRpn.

Then, the subtractor 400D subtracts the reactive current subtraction amount Δid4 from the reactive current reference value idref, to calculate the reactive current command value id*.

As described above, according to the present embodiment, as in the above embodiments, for example, in such a case of being interconnected to the AC power grid having a small short-circuit capacity, when unbalance failure occurs in the power grid and the voltage amplitude for a sound phase of the grid voltage increases due to output of reactive power, by limiting the reactive power to be outputted, a control margin of the reactive power compensation device can be ensured and the reactive power compensation device can be prevented from being stopped for protection due to overvoltage or overcurrent.

In addition, the output limit unit subtracts the reactive current subtraction amount set in advance on the basis of an impedance of the AC power grid, from the reactive current reference value, to calculate the reactive current command value, thus limiting the output reactive current of the power converter. Thus, control of the reactive power compensation device is facilitated.

Figure 17:
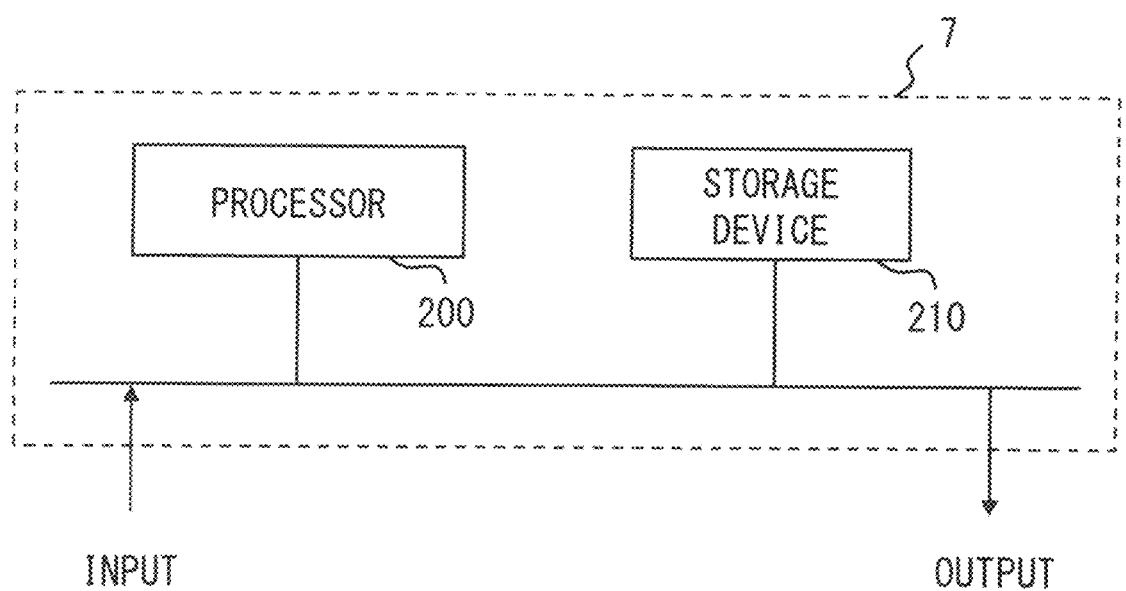
FIG. 17 is a block diagram showing a configuration example of hardware of the converter control unit according to each embodiment of the present disclosure.

In the above embodiments, the converter control unit 7 is composed of a processor 200 and a storage device 210, as shown in FIG. 17 which shows a configuration example of hardware. Although not shown, the storage device 210 is provided with a volatile storage device such as a random access memory and a nonvolatile auxiliary storage device such as a flash memory.

Instead of the flash memory, an auxiliary storage device of a hard disk may be provided. The processor 200 executes a program inputted from the storage device 210. In this case, the program is inputted from the auxiliary storage device to the processor 200 via the volatile storage device. The processor 200 may output data such as a calculation result to the volatile storage device of the storage device 210, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF TEE REFERENCE CHARACTERS 1 reactive power compensation device
2 AC power grid
3 interconnection transformer
4 arm
5 arm reactor
6 power converter
7 converter control unit
10 unit cell
11 positive-phase-sequence voltage detection unit
12 each-phase voltage amplitude detection unit
13 voltage control unit
15 DC capacitor
16 maximum value calculation unit
17 subtraction value calculation unit
20 voltage detector
21 AC voltage detection unit
22 output limit unit
23 gate signal circulation unit
30 current detector
40 arm current detector
50 DC capacitor voltage detector
50 DC voltage control unit
70 circulation current control unit
90 output current control unit
101 series unit
102 semiconductor switch
103 switching element
104 diode
120 gate signal generation unit
130 voltage command value calculation unit
140 cell individual DC voltage control unit
200 processor
210 storage device

The invention claimed is:

1. A reactive power compensation device comprising:
a power converter connected to an AC power grid with a plurality of phases, and having a self-turn-off switching element; and
a converter control circuitry which controls the switching element of the power converter, wherein
reactive power of the AC power grid is compensated by output reactive power of the power converter,
the converter control circuitry includes an AC voltage detection circuitry and an output limit circuitry,
the AC voltage detection circuitry detects voltage information of the AC power grid to which the power converter is connected,
the AC voltage detection circuitry includes a positive-phase-sequence voltage detection circuitry for detecting positive-phase-sequence voltage of grid voltage of the AC power grid, and
the output limit circuitry determines whether or not the output reactive power of the power converter needs to be limited, on the basis of the voltage information detected by the AC voltage detection circuitry including the positive-phase-sequence voltage detected by the positive-phase-sequence voltage detection circuitry, and in a case where the output reactive power needs to be limited, limits the output reactive power of the power converter.

2. The reactive power compensation device according to claim 1, wherein
in the case where the output reactive power needs to be limited, the output limit circuitry limits the output reactive power of the power converter so that output voltage of the power converter is kept within an output possible range of the power converter.

3. The reactive power compensation device according to claim 2, wherein
in the case where the output reactive power of the power converter needs to be limited, the output limit circuitry limits output reactive current of the power converter.

4. The reactive power compensation device according to claim 3, wherein
the AC voltage detection circuitry calculates a reactive current reference value on the basis of the positive-phase-sequence voltage detected by the positive-phase-sequence voltage detection circuitry and a voltage command value for the power converter, and
the output limit circuitry subtracts a reactive current subtraction amount from the reactive current reference value, to calculate a reactive current command value, thus limiting the output reactive current of the power converter.

5. The reactive power compensation device according to claim 4, wherein
the output limit circuitry subtracts the reactive current subtraction amount set in advance on the basis of an impedance of the AC power grid, from the reactive current reference value, to calculate the reactive current command value, thus limiting the output reactive current of the power converter.

6. The reactive power compensation device according to claim 2, wherein
the AC voltage detection circuitry detects magnitudes of voltages for the respective phases of grid voltage of the AC power grid, and
the output limit circuitry calculates a maximum value among the magnitudes of the voltages for the respective phases detected by the AC voltage detection circuitry, and determines whether or not the output reactive power of the power converter needs to be limited, on the basis of the maximum value among the magnitudes of the voltages for the respective phases.

7. The reactive power compensation device according to claim 1, wherein
in the case where the output reactive power of the power converter needs to be limited, the output limit circuitry limits output reactive current of the power converter.

8. The reactive power compensation device according to claim 7, wherein
the AC voltage detection circuitry calculates a reactive current reference value on the basis of the positive-phase-sequence voltage detected by the positive-phase-sequence voltage detection circuitry and a voltage command value for the power converter, and
the output limit circuitry subtracts a reactive current subtraction amount from the reactive current reference value, to calculate a reactive current command value, thus limiting the output reactive current of the power converter.

9. The reactive power compensation device according to claim 8, wherein
the output limit circuitry subtracts the reactive current subtraction amount set in advance on the basis of an impedance of the AC power grid, from the reactive current reference value, to calculate the reactive current command value, thus limiting the output reactive current of the power converter.

10. The reactive power compensation device according to claim 9, wherein
the AC voltage detection circuitry detects magnitudes of voltages for the respective phases of grid voltage of the AC power grid, and
the output limit circuitry calculates a maximum value among the magnitudes of the voltages for the respective phases detected by the AC voltage detection circuitry, and determines whether or not the output reactive power of the power converter needs to be limited, on the basis of the maximum value among the magnitudes of the voltages for the respective phases.

11. The reactive power compensation device according to claim 8, wherein
the AC voltage detection circuitry detects magnitudes of voltages for the respective phases of grid voltage of the AC power grid, and
the output limit circuitry calculates a maximum value among the magnitudes of the voltages for the respective phases detected by the AC voltage detection circuitry, and determines whether or not the output reactive power of the power converter needs to be limited, on the basis of the maximum value among the magnitudes of the voltages for the respective phases.

12. The reactive power compensation device according to claim 7, wherein
the AC voltage detection circuitry detects magnitudes of voltages for the respective phases of grid voltage of the AC power grid, and
the output limit circuitry calculates a maximum value among the magnitudes of the voltages for the respective phases detected by the AC voltage detection circuitry, and determines whether or not the output reactive power of the power converter needs to be limited, on the basis of the maximum value among the magnitudes of the voltages for the respective phases.

13. The reactive power compensation device according to claim 1, wherein
the power converter includes three arms connected to the AC power grid,
each of the arms is formed such that one unit cell or a plurality of unit cells connected in cascade, and a reactor, are connected in series, and
the unit cell includes a series unit composed of a plurality of the switching elements connected in series to each other, and a DC capacitor connected in parallel to the series unit.

14. The reactive power compensation device according to claim 13, wherein
the three arms are delta-connected.

15. The reactive power compensation device according to claim 13, wherein
the unit cell has a full-bridge configuration in which a plurality of the series units each composed of the switching elements are connected in parallel.

16. A reactive power compensation device comprising:
a power converter connected to an AC power grid with a plurality of phases, and having a self-turn-off switching element; and
a converter control circuitry which controls the switching element of the power converter, wherein
reactive power of the AC power grid is compensated by output reactive power of the power converter,
the converter control circuitry includes an AC voltage detection circuitry and an output limit circuitry,
the AC voltage detection circuitry detects magnitudes of voltages for the respective phases of grid voltage of the AC power grid, and
the output limit circuitry calculates a maximum value among the magnitudes of the voltages for the respective phases detected by the AC voltage detection circuitry, and
calculates a deviation between the maximum value and a predetermined voltage maximum allowable value, and calculates at least one of a reactive current subtraction amount and a reactive power subtraction amount for reducing the deviation, thus limiting output reactive current of the power converter.

17. A reactive power compensation device comprising:
a power converter connected to an AC power grid with a plurality of phases, and having a self-turn-off switching element; and
a converter control circuitry which controls the switching element of the power converter, wherein
reactive power of the AC power grid is compensated by output reactive power of the power converter, the converter control circuitry includes an AC voltage detection circuitry and an output limit circuitry, the AC voltage detection circuitry includes a positive-phase-sequence voltage detection circuitry for detecting positive-phase-sequence voltage of grid voltage of the AC power grid, a negative-phase-sequence voltage detection circuitry for detecting negative-phase-sequence voltage of the grid voltage of the AC power grid, and an unbalance factor detection circuitry for calculating an unbalance factor which is a ratio of the negative-phase-sequence voltage to the positive-phase-sequence voltage, and the output limit circuitry determines whether or not the output reactive power of the power converter needs to be limited, on the basis of the unbalance factor calculated by the unbalance factor detection circuitry.

18. The reactive power compensation device according to claim 17, wherein the output limit circuitry calculates a deviation between the unbalance factor calculated by the unbalance factor detection circuitry and a predetermined threshold, and calculates a reactive current subtraction amount or a reactive power subtraction amount for reducing the deviation, thus limiting output reactive current of the power converter.

* * * * *